(12) United States Patent
Takeda et al.

(10) Patent No.: US 7,076,620 B2
(45) Date of Patent: Jul. 11, 2006

(54) DATA PROCESSING SYSTEM INCLUDING STORAGE SYSTEMS

(75) Inventors: Takahiko Takeda, Minamiashigara (JP); Yoshihiro Asaka, Odawara (JP); Kenji Yamagami, Odawara (JP); Katsuyoshi Suzuki, Odawara (JP); Tetsuya Shirogane, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 10/603,076

(22) Filed: Jun. 23, 2003

(65) Prior Publication Data

US 2004/0172509 A1    Sep. 2, 2004

(30) Foreign Application Priority Data

Feb. 27, 2003 (JP) .............................. 2003-050244

(51) Int. Cl.
*G06F 12/06* (2006.01)
(52) U.S. Cl. ....................... 711/161; 711/162; 707/202; 707/203; 707/204
(58) Field of Classification Search ................ 711/161, 711/162; 707/202
See application file for complete search history.

(56) References Cited

U.S. PATENT DOCUMENTS

| | | |
|---|---|---|
| 5,155,845 A | 10/1992 | Beal et al. |
| 5,170,480 A | 12/1992 | Mohan et al. |
| 5,307,481 A | 4/1994 | Shimazaki et al. |
| 5,379,418 A | 1/1995 | Shimazaki et al. |
| 5,459,857 A | 10/1995 | Ludlam et al. |
| 5,544,347 A | 8/1996 | Yanai et al. |
| 5,720,029 A | 2/1998 | Kern et al. |
| 5,734,818 A | 3/1998 | Kern et al. |
| 5,742,792 A | 4/1998 | Yanai |
| 5,901,327 A | 5/1999 | Ofek |
| 5,933,653 A | 8/1999 | Ofek |
| 6,044,444 A | 3/2000 | Ofek |
| 6,092,066 A | 7/2000 | Ofek |
| 6,101,497 A | 8/2000 | Ofek |
| 6,157,991 A | 12/2000 | Arnon |

(Continued)

FOREIGN PATENT DOCUMENTS

EP    1115225    7/2001

(Continued)

OTHER PUBLICATIONS

Lyon "Tandem's Remote Data Facility," IEEE Feb.-Mar. 1990, pp. 562-567 (1990).

*Primary Examiner*—Mano Padmanabhan
*Assistant Examiner*—Craig E Walter
(74) *Attorney, Agent, or Firm*—Mattingly, Stanger, Malur & Brundidge, P.C.

(57) ABSTRACT

A data processing system includes a first storage system including a first host and a first storage subsystem. The first host has access to a first copy manager that is operable to manage a data replication operation. A second storage system includes a second host and a second storage subsystem. The second host has access to a second copy manager that is operable to manage a data replication operation. A first communication link is coupled to the first storage system and the second storage system to exchange management information between the first and second storage systems in order to manage the data replication operation. A data transfer path is configured to transfer data stored in the first storage subsystem to the second storage subsystem and replicate the data of the first storage subsystem in the second storage subsystem. The data transfer path is different from the first communication link.

16 Claims, 15 Drawing Sheets

U.S. PATENT DOCUMENTS

| | | | |
|---|---|---|---|
| 6,173,377 B1 * | 1/2001 | Yanai et al. | 711/162 |
| 6,324,654 B1 | 11/2001 | Wahl et al. | |
| 6,338,126 B1 | 1/2002 | Ohran | |
| 6,360,306 B1 | 3/2002 | Bergsten | |
| 6,363,462 B1 | 3/2002 | Bergsten | |
| 6,393,538 B1 | 5/2002 | Murayama | |
| 6,446,175 B1 * | 9/2002 | West et al. | 711/162 |
| 6,446,176 B1 | 9/2002 | West et al. | |
| 6,477,627 B1 | 11/2002 | Ofek | |
| 6,496,908 B1 | 12/2002 | Kamvysselis et al. | |
| 6,526,487 B1 | 2/2003 | Ohran | |
| 6,549,920 B1 | 4/2003 | Obara | |
| 6,560,617 B1 | 5/2003 | Winger | |
| 6,609,183 B1 * | 8/2003 | Ohran | 711/161 |
| 6,636,981 B1 | 10/2003 | Barnett et al. | |
| 6,732,124 B1 * | 5/2004 | Koseki et al. | 707/202 |
| 2002/0133511 A1 | 9/2002 | Hostetter | |
| 2002/0194442 A1 | 12/2002 | Yanai et al. | |
| 2003/0115224 A1 | 6/2003 | Obrara | |

FOREIGN PATENT DOCUMENTS

| | | |
|---|---|---|
| JP | 62-274448 | 11/1987 |
| JP | 02-037418 | 2/1990 |
| JP | 07-191811 | 7/1995 |

* cited by examiner

Fig. 16

| Host | Host access LU | Storage device | Storage device LU |
|---|---|---|---|
| 100B | 0 ~ 3 | 200X | 0 ~ 3 |
|  | 4 ~ 7 | 200Y | 0 ~ 3 |
|  | 8 ~ 11 | 200Y | 12 ~ 15 |
|  | 12 ~ 15 | 200Z | 16 ~ 19 |
|  |  |  |  |
| 100C | 0 ~ 7 | 200Y | 4 ~ 11 |
|  | 8 ~ 11 | 200Z | 4 ~ 7 |
|  |  |  |  |

DATA PROCESSING SYSTEM INCLUDING STORAGE SYSTEMS

BACKGROUND OF THE INVENTION

1. Field of the Invention

The present invention relates to a technology where data stored in a first storage system is replicated in a second storage system.

2. Description of Related Art

In recent years, in order to offer a continuing service to customers at all times, a technology relating to remote replication has become important, so that a data processing system offers storage service even when a primary storage system experiences a failure. U.S. Pat. No. 5,170,480 to Mohan discloses a technology where information in the first information processing system is replicated in a second information processing system. In Mohan, a computer included in a first information processing system (hereinafter, "primary host") coupled to a disk array device (hereinafter, "primary disk array device") transmits data stored in the primary disk array device to a disk array device (hereinafter, "secondary disk array device") included in a second information processing system through a communication line and a computer included in the secondary information processing system (hereinafter, "secondary host").

On the other hand, due to development of computer networks, information processing systems owned by business enterprises become more complicated. As a result, the requirement for collective management of apparatuses connected to a network is increasing. As a technology satisfying such a demand, there has been devised a technology called virtualization where a plurality of storage subsystems connected with one another through a network, such as a Fibre Channel or the Internet, are managed collectively and are provided to the user as a virtually single or plural storage subsystems. Thereby, the user of the information processing system can use the plurality of storage subsystems as if it were a single storage subsystem.

As used herein, the term "storage subsystem" refers to the storage apparatus such as a hard disk drive, an aggregate of a plurality of hard disk drives, a disk array device wherein a control unit controls a plurality of hard disk drives, etc.

As used herein, the term "storage system" and "site" both refers to the system comprised of one or more host computers and one or more storage subsystems connected to them.

A host computer may be referred to as "host".
A storage device may be referred to as "storage".

SUMMARY OF THE INVENTION

Here, consider a case where the Mohan's technology is applied to a complicated information processing system.

In Mohan, the data stored in both disk array devices is transferred between the primary host and the secondary host. That is, each host is used as a path for the data transfer. Further, each host connected to the network retains information on a plurality of disk array devices connected to the network (network address etc.).

Therefore any one of a large number of the existing disk array devices is selected by each host appropriately and data is easily replicated in a selected disk array. In particular, in the case where the Mohan's technology is applied to the virtualization, a device that controls the virtualization (computer or switch) and hosts can be brought into cooperation with one another. However, since the data stored in each disk array device is transferred through a communication link between the hosts, there is a problem that channel load of the hosts and traffic of the line connecting the hosts increase.

One embodiment of this invention is directed to solve the above problem. A primary host and a secondary host monitor statuses of storage subsystems connected to the hosts, for example, each of the primary and secondary disk array devices, based on software operating on each host. Further, the primary or secondary host directs the data transfer between disk array devices to the primary or secondary disk array device if needed. Moreover, each host exchanges information for performing the data transfer between the disk array devices by inter-host communication. On the other hand, data stored in each disk array device is transferred between the disk array devices directly. A configuration where the data is transferred by using a removable storage medium such as a tape device rather than the private line is possible.

In another implementation, the primary disk array device stores information for updating data stored in the primary disk array device as "journal" (updating history). More specifically, the journal is the record comprised of a copy of the data used for updating and metadata. Furthermore, the primary disk array device is so configured as to transfer this journal to the secondary disk array device according to instructions of the primary and secondary hosts. The secondary disk array device updates the data stored in the secondary disk array device similarly to the update method performed in the primary disk array device, i.e., by using the journal received from the primary disk array device according to instructions of the secondary host. Updating in the primary disk array device is reproduced in the secondary disk array device, so the latter updating (in the secondary disk array device) may be referred to as "restore".

In still another implementation, it may be applicable that journal is transferred by issuing a journal copy instruction to the primary disk array device.

In yet another implementation, it may also be applicable that the disk array device connected to each host is a storage subsystem that is virtualized by a device for controlling the virtualization. In this case, the data transfer is performed between devices each for controlling the virtualization or by each storage subsystems connected to the device for controlling the virtualization.

BRIEF DESCRIPTION OF THE DRAWINGS

FIG. 16 shows a table of including address information of disk array devices comprising a virtual storage volume that has been associated with a host in a virtualization server 300B of FIG. 13.

DETAILED DESCRIPTION OF THE PREFERRED EMBODIMENTS

Figure 1:
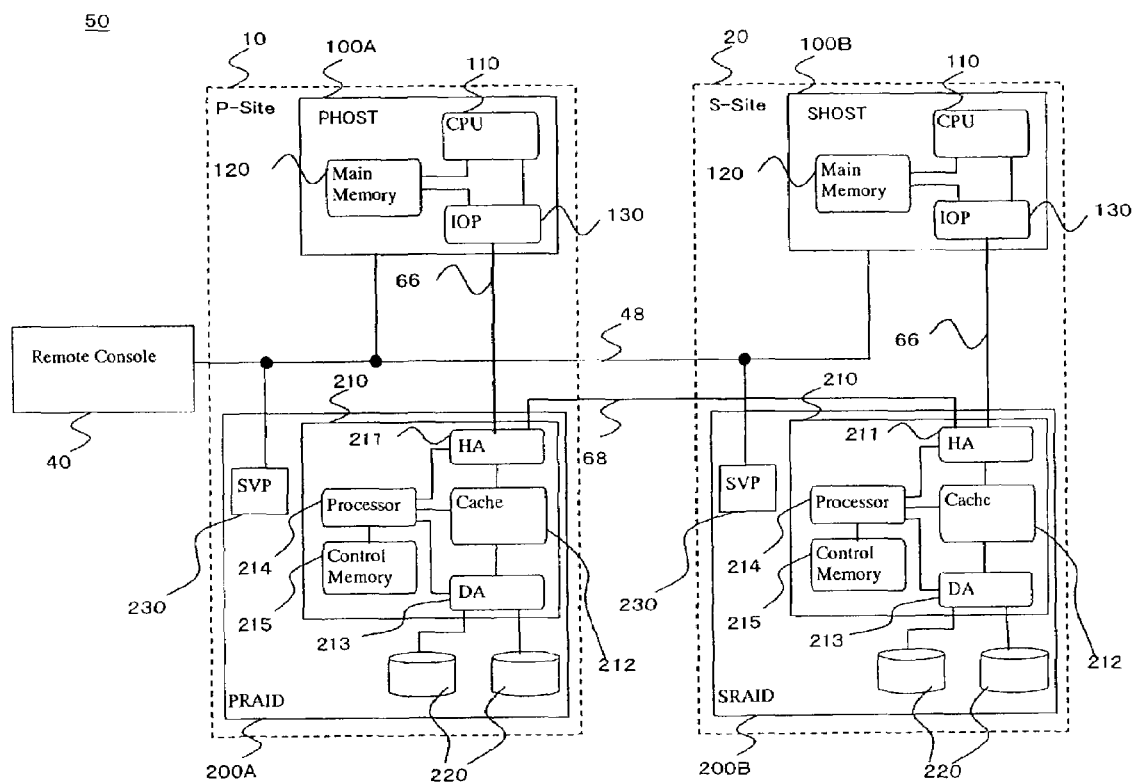
FIG. 1 shows a hardware configuration of a data processing system according to one embodiment of the present invention.

FIG. 1 shows a hardware configuration of a data processing system 50 according to a first embodiment of this invention.

This data processing system comprises a first storage system 10 (hereinafter, "primary storage system" or "primary site") having a primary host 100A and a primary storage subsystem or disk array device 200A, a second storage system 20 (hereinafter, "secondary storage system" or "secondary site") having a secondary host 100B and a secondary storage subsystem or disk array device 200B, and a remote console 40. In the embodiments disclosed herein, disk array devices are used as the storage subsystems for illustration purposes. The storage subsystems may be storage devices other than disk array devices and are not limited thereto. The primary site and the primary disk array devices may be referred to as a first site and a first disk array device, respectively. Similarly, the secondary site and the secondary disk array devices may be referred to as a second site and a second disk array device, respectively.

Each host 100 (the primary host 100A and the secondary host 100B) is a computer that has a CPU 110, a main memory 120, and an input/output (I/O) processing device 130. For example, it may be a workstation, a microcomputer, a mainframe computer, or the like.

Each disk array device 200 (the primary disk array device 200A and the secondary disk array device 200B) has a storage controller 210, a plurality of disk units 220, and an SVP (Service Processor) 230. The storage controller 210 has a host adapter 211, cache memory 212, a disk adapter 213, a processor 214, and control memory 215.

The primary host 100A is connected with the primary disk array device 200A and the secondary host 100B is connected with the secondary disk array device 200B, respectively, with a Fibre Channel 66. The CPU 110 and the main memory 120 of each host 100 are connected to the host adapter 211 of the disk array device 200 through the I/O processing device 130 and the Fibre Channel 66.

Further, the primary disk array device 200A and the secondary disk array device 200B are connected with each other through a Fibre Channel 68. The primary disk array device and the secondary disk array device may be provided within the same room, or building. Alternatively, they may be separated by a considerable distance to safeguard against both devices experiencing a common failure at the same time. If the distance between the primary site 10 and the secondary site 20 is long, that is, the distance exceeds the data transferable distance of the Fibre Channel 68, the disk array devices may be connected through a long-distance communication link, such as, ATM through extender devices in addition to the Fibre Channel 68.

The remote console 40 is also a computer that has a CPU and a main memory. The remote console 40, the primary host 100A, the secondary host 100B, the primary disk array device 200A, and the secondary disk array device 200B are interconnected through an IP network 48, such as LAN (Local Area Network) or WAN (Wide Area Network). That is, the data processing system 50 includes at least two communication links coupling the primary and secondary storage systems, the Fibre Channel 68 linking the disk array devices 200A and 200B and the IP network 48 linking the hosts 100A and 100B. In the present embodiment, these two communication links are of different technologies, as explained above. However, the communication links 48 and 66 may be of the same technology, e.g., both may be an IP network.

Figure 10:
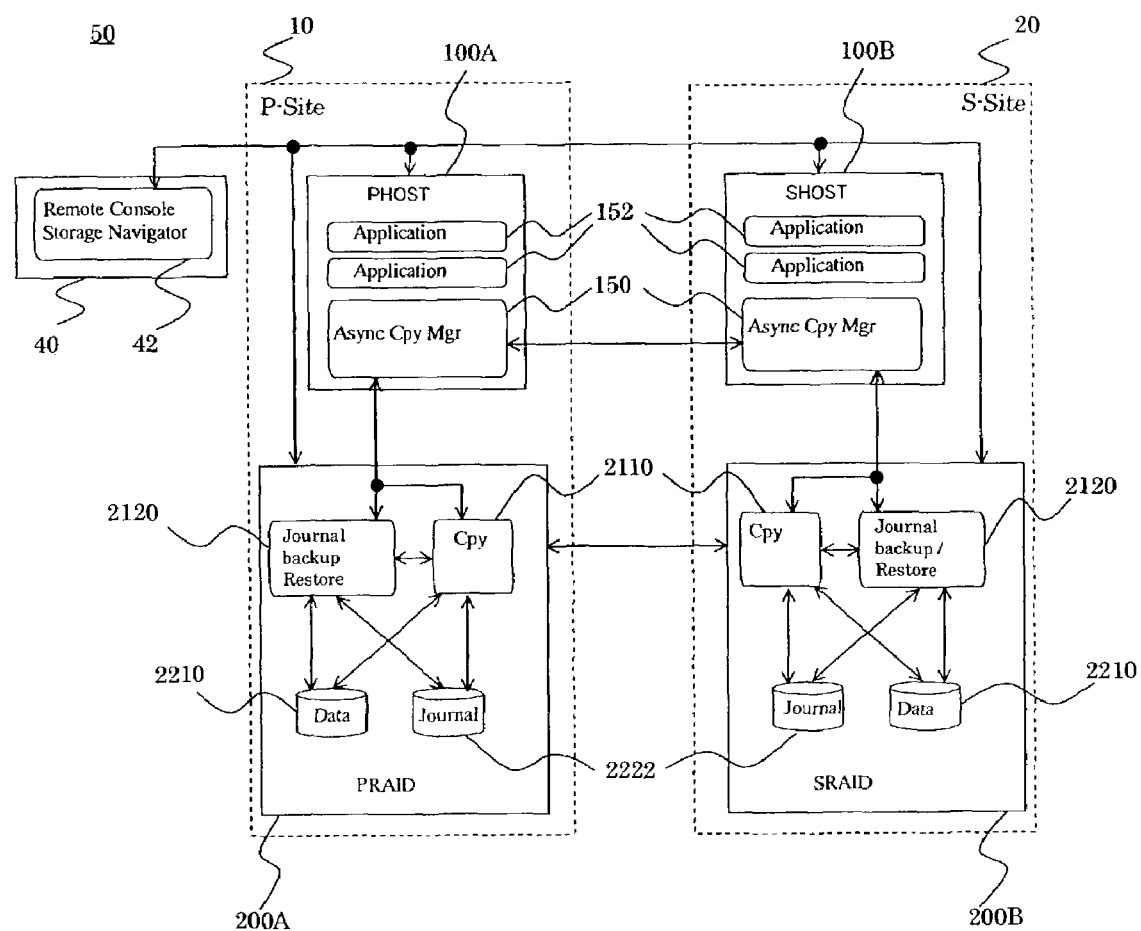
FIG. 10 shows a logical configuration of the data processing system of FIG. 1.

FIG. 10 shows a logical configuration of the data processing system of FIG. 1.

In each host 100, an asynchronous copy manager 150 that is a program for controlling the data transfer between the disk array devices 200 is executed on the CPU 110. The asynchronous copy manager 150 is stored in the main memory 120. Each host 100 executing the asynchronous copy manager 150 manages respective disk array device 200 with respect to operations relating to the journal processing (e.g., acquisition and transfer of the journal, and restoration of data using the journal) in response to a user's request inputted to each host 100 directly or via a network, or a request that has been prearranged. The details of journal processing will be described later.

Further, the asynchronous copy managers 150 of the hosts 100 communicate with together during the journal processing using an IP network 48 and exchange management information that are needed to facilitate the journal processing, e.g., journal creation state, which will be described later.

On a storage controller 210 of each disk array device 200, a copy program 2110 and a journal-backup/restore program 2120 are executed by the processor 214. These programs are stored in control memory 215. The journal-backup/restore program 2120 is composed of a journal backup program and a journal restore program. Moreover, the storage controller 210 handles I/O requests to the disk device 220 based on instructions from the hosts in addition to the copy program 2110 and the journal-backup/restore program 2120.

The disk device 220 includes or is associated with one or more logical storage areas (volumes). These logical volumes are used as a data volume area 2210 or a journal volume area 2222, as desired by the user.

By executing the asynchronous copy manager 150, each host 100 controls execution of the journal-backup/restore program 2120 and the copy program 2110 provided for each disk array device 200. In each host 100, application programs 152 used by the user and a program serving as a disk array device control interface (hereinafter, "RAID manager") are executed by the CPU 110 of each host 100. Moreover, the asynchronous copy manager 150 and the RAID manager exchange information mutually using an inter-program communication.

On the remote console 40, a program 42 called a remote console storage navigator is executed. The remote console 40 performs management of constituent members of the data processing system of this embodiment, more specifically, the hosts 100 and the disk array devices 200, by executing the program 42. The program 42 is stored in the main memory of the remote console 40.

The programs explained so far are installed in a storage medium associated with each device, e.g., a removable storage medium, such as a compact disk and a magnetic-optical disk, or through the IP network 48.

Figure 2:
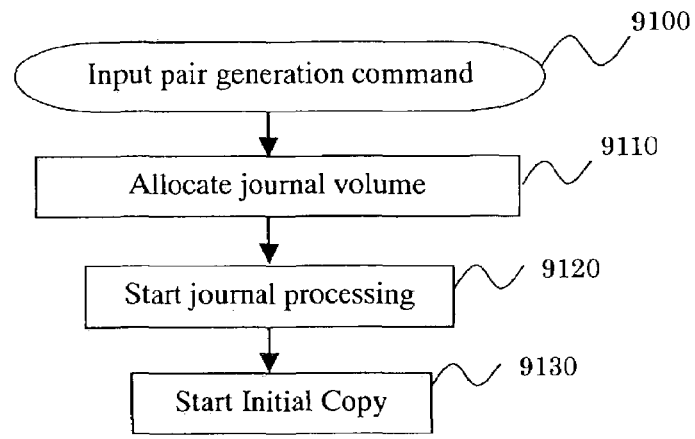
FIG. 2 is a flowchart showing an outline of operations performed in the data processing system of FIG. 1 according to one embodiment of the present invention.
Figure 2:
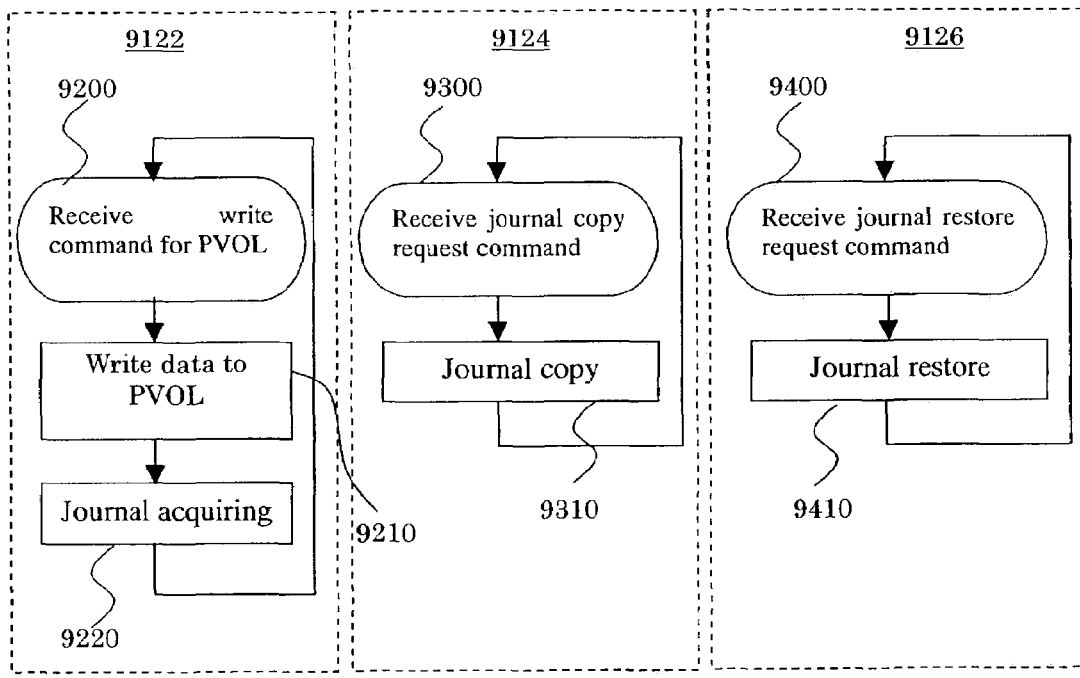

FIG. 2 is a flowchart showing the outline of operations of the data processing system of the first embodiment.

At step 9100, by using a graphical user interface ("GUI"), which is included in either the host 100 or the remote console 40, the user inputs a pair generation command to the host 100 (either of the primary host 100A or the secondary host 100B may be used). The pair generation command is a command that associates a first volume (hereinafter, "PVOL") 2212 of the primary disk array device 200A, which is targeted for journal acquisition, and a second volume (hereinafter, "SVOL") 2214 of the secondary disk array device 200B, which is a replication pair of PVOL.

The host 100 that received the pair generation command controls the first and second disk array devices 200A and 200B, so that a volume 2222A for storing a journal of the PVOL 2212 (hereinafter, "journal volume") is allocated in the primary disk array device 200A and a journal volume 2222B for storing a journal of the SVOL 2214 is allocated in the secondary disk array device 200B (Step 9110). A pair of PVOL 2212 and the journal volume 2222A assigned to PVOL 2212 is referred to as a journal group, and a pair of SVOL 2214 and the journal volume 2222B assigned to SVOL 2214 is called a journal group. A journal group is also cited as "journal pair". And the pair generation command also defines the association of the journal pair of PVOL and the journal pair of SVOL. This association (i.e. pair of journal pairs) is cited as "device group".

Each of the PVOL and SVOL may include only one volume, or may be a group of two or more volumes (volume group). A user specifies a volume group at the time of inputting the pair generation command. Each disk array device 200 is provided with a capability, so that the specified volume group may be treated as a single virtual volume and may perform journal processing (described later) as if it were using a single volume. The journal volume may be a volume group as well.

In this embodiment, the first host 100A primarily controls the first disk array device 200A, and the secondary host 100B primarily controls the secondary disk array device 200B. Therefore, when the secondary host 100B receives the pair generation command, the secondary host 100B transfers information required by the first disk array device 200A among pieces of information included in the pair generation command (information for specifying a device group) to the primary host 100A through the IP network 48. Similarly, when the first or primary host 100A receives the pair generation command, the primary host 100A transfers information required by the secondary disk array device 200B to the secondary host 100B.

As methods for allocating a journal volume, at least the following two methods may be used for the present embodiment: (1) at the time of inputting the pair generation command, the user itself specifies the journal volume; and (2) the host 100 selects an unused logical volume arbitrarily and uses it. For example, the following procedures are taken. First, in each disk array device 200, unused logical volumes are managed in the respective control memory 215 as a journal volume pool for future user as the journal volumes.

Each disk array device 200 notifies information on the logical volumes registered in the journal volume pool, for example, physical addresses in the disk array device 200A, the storage capacity of the physical volume, etc. to the respective host 100. The host 100 that received the pair generation command selects an appropriate volume as the journal volume based on the information notified by the disk array device. In one implementation, it does not matter whether the selected volume is a single volume or a volume group, i.e., a plurality of volumes. If it is a plurality of volumes, the volumes are treated as a single virtual volume.

The user can specify whether or not a normal application executed on the host 100 is capable of issuing I/O request to the journal volume. There are two cases:
(1) one is that a volume allocated on the disk device 220 used for normal I/O processing is selected as the journal volume; and (2) the other is that a volume that the host 100 cannot use for the normal I/O processing is selected as the journal volume.

In the former case, the journal can be seen from a normal application on the host 100 or from another host connected to the disk array device 200 through the Fibre Channel. Therefore, acquisition and control of statistics on the journal can be performed by a normal application, but there is possibility of destroying the journal erroneously.

In the latter case, the journal of the host 100 is allowed to be seen only when the host 100 executing the asynchronous copy manager 150 makes each disk array device 200 execute the journal restore program or the copy program. Therefore, the journal is not destroyed by the normal I/O processing performed by the host 100.

Thereafter, a journal processing is performed, e.g., in the first storage system 10 (Step 9120). The journal processing includes an acquisition operation 9122, a copy operation 9124, and a restoration operation 9126. The journal acquisition operation or process 9122 involves the primary disk array device 200A acquiring the journal for PVOL 2212 after receiving a journal acquisition start command from the primary host 100. After receiving the command, the primary disk array device. 200A commence storing journal data and metadata in the journal volume 2222A (Step 9220) after each write operation to PVOL 2212 (Steps 9200 and 9210). The journal data is a copy of the data written or updated according to the write command. The metadata provides information relating to a time when the update data is stored in the PVOL 2212, the storing address of the written (updated) data, address of the corresponding journal data in the journal data area, and the length of the data. A journal is composed of the journal data and corresponding metadata.

After the journal acquisition processing has been started, each host 100 executes the asynchronous copy manager 150, and controls journal copy processing periodically. The journal copy processing relates to transferring of the journal between the first and second disk array devices 200A and 200B. The journal copy process 9124 is initiated when the primary host 100A decides that the journal needs to be copied (e.g., a predetermined amount of information has been stored in the journal volume 2222A in the primary disk device 200A) according to the information on journal creation state acquired from the primary disk drive 200A (details will be described later). The primary host 100A, in turn, notifies the secondary host 100B via the link 48.

Thereupon, the secondary host 100B then transmits a copy request ("journal copy request command") to the secondary disk array device 200B to initiate journal transfer from the primary disk array device 200A (Step 9300).

After receiving the journal copy request command, the secondary disk array device 200B issues a data read request to the primary disk array device 200A (Step 9310). The primary disk array device 200A transmits the requested data to the secondary disk array device 200B by executing the copy program 2110. Details of the journal copy processing will be described later.

On the other hand, the data that had been stored in PVOL 2212 before the journal acquisition process was started is not transferred to the secondary disk array device 200B even when the journal copy processing was started. Therefore, it is necessary to copy these data (hereafter "initial data") to SVOL 2214 from PVOL 2212. In the present embodiment, an initial copy process is used to transfer the initial data from the PVOL 2212 to SVOL 2214 (Step 9130). The initial data are transferred sequentially from the volume head area to the end of PVOL 2212 according to instructions of the host 100. This process may also be performed by allowing each disk array device 200 itself to execute the copy program 2110.

The initial copy and the journal copy processing may be performed asynchronously and in parallel. That is, the initial copy can be performed anytime after PVOL 2212 and SVOL 2214 have been specified based on the pair generation command, regardless of whether or not the journal acquisition process and the journal copy process has been performed or is being performed. However, as long as the initial copy has not been completed, the contents of SVOL 2214 does not reflects PVOL 2212 even if the restoration process 9126 has been performed at the secondary disk array device 200B. The restore or restoration process involves updating or coping the data of PVOL 2212 in the SVOL 2214 using the journal that have been received from the primary disk array device 200A according to the copy process 9124.

In one implementation, the initial copy initiated by the secondary disk array device 200B issuing one or plural read commands to the primary disk array device 200A in order to reduce the load of the primary disk array device 200A.

Once all initial data have been copied into SVOL 2214 of the secondary disk array device 200B, the copy program 2110B reports completion of the initial copy to the secondary host 100B. Thereafter, an accurate recovery of data in the secondary site 20 becomes possible. Generally, the initial copy is started after the start of the journal acquisition processing.

The journal acquisition process 9122 may be stopped by a command ("journal acquisition stop command") from the host 100A to the primary disk array device 200A.

After receiving a journal restore request command from the secondary host 100B (Step 9400), the secondary disk array device 200B restores the data stored in the SVOL 2214 by using the journal stored in the journal volume 2222B (Step 9410). This process is referred to as a journal restore process. The details of journal restore process will be described later.

Figure 3:
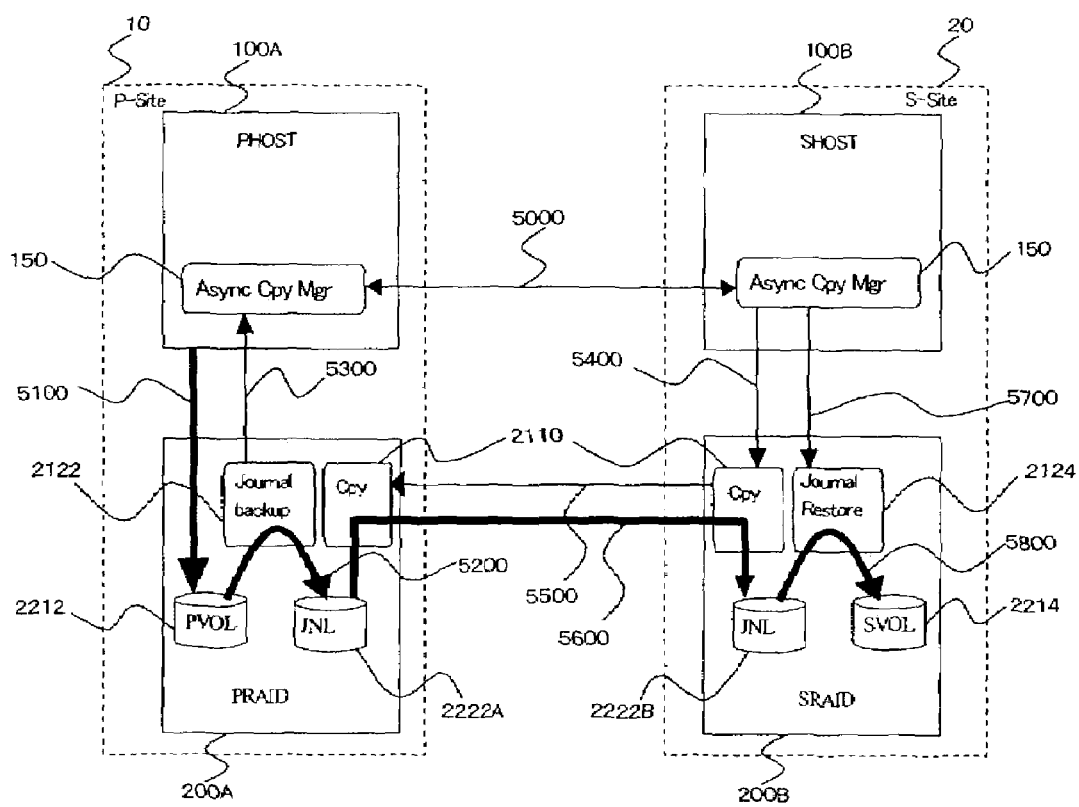
FIG. 3 shows operations of acquisition, copy and restore processing of the journal in the one embodiment data processing system disclosed in FIG. 1.

FIG. 3 illustrates journal acquisition, journal copy, and journal restore processes according to the first embodiment of the invention. These processes are controlled by respective hosts 100A and 100B by executing the asynchronous copy manager 150. The primary disk array device 200A executes the journal backup program 2122 in the journal-backup/restore program 2120. By executing the journal backup program 2122, the primary disk array device 200A stores a copy of the data that is to be written in PVOL 2212, in the journal volume 2222A, as journal data. The primary disk array device 200A also stores metadata in the journal volume 2222A as part of the journal. The above step is referred to as the journal acquisition process 9122.

The secondary disk array device 200B performs the journal restore process 9126 by executing a journal restore program 2124 in the journal-backup/restore program 2120. The journal restore program 2124 restores journal in the journal volume 2222B, so that the data volume 2214 reflects the updated data image of PVOL 2212.

Hereafter, the journal acquisition, copy and restore processes will be explained using block diagrams of FIG. 3.

When the journal acquisition process for the data volume 2210 is started in the primary disk array device 200A, the primary disk array device 200A creates the journal and stores it in the journal volume 2222A according to write operation 5100 from the primary host 100A to PVOL 2212 (Step 5200).

The primary host 100A acquires information on journal creation state (e.g., storage size of the journals in the journal volume) from the primary disk array device 200A by issuing a journal-creation-state-acquisition command to the primary disk array device 200A by executing the asynchronous copy manager 150 (Step 5300).

The primary host 100A communicates the acquired information on the journal creation state to the secondary host 100B via the IP network 48, so that the remote replication process can be coordinated by the two host devices (Step 5000). One of the use of this information is to notify the hosts 100A and 100B as to when the journal in the journal volume 2222A is ready to be copied to the secondary disk device 200B.

The secondary host 100B executes the asynchronous copy manager 150 and issues the journal copy request command to the secondary disk array device 200B in accordance with an instruction from the user inputted through GUI or a predetermined schedule or via a notification from the primary host 100A (Step 5400).

The journal copy request command includes information specifying the journal (plurality of journals can be applied) to be copied, the journal volume in which that journal is stored, and the disk array device 200 having that journal volume. The request also includes information specifying the destination journal volume where the copied journal is to be stored.

The storage controller 210B of the secondary disk array device 200B receives the journal copy request command and issues a read command to the primary disk array device 200A by executing the copy program (Step 5500). The primary disk array device 200A receives the read command and transmits the journal specified by the read command to the secondary disk array device 200B (Step 5600). An area wherein the transmitted journal was stored is purged, so that a new journal may be stored therein.

Upon receipt of the journal, the secondary disk array device 200B stores the journal in the journal volume 2222B specified by the journal copy request command. Subsequently, the secondary host 100B issues the journal restore request command to the secondary disk array device 200B (Step 5700).

The secondary disk array device 200B receives the journal restore request command and executes the journal restore program 2124, thereby restoring data from the journal volume 2222B to SVOL 2214 (Step 5800). An area wherein the restored journal has been stored is purged, so that a new journal can be stored.

The host 100 executing the asynchronous copy manager 150 can perform host fail over. That is, in the case where the primary host 100A becomes unavailable for a certain reason and cannot continue with the journal copy process, the secondary host 100B may perform the functions of the primary host 100A as well.

In one implementation, the primary disk array device is coupled to a plurality of primary hosts, as in a storage area network. The journal acquisition and other processes disclosed above may be performed in such a configuration with some modification, as will be understood by one skilled in the art.

Figure 4:
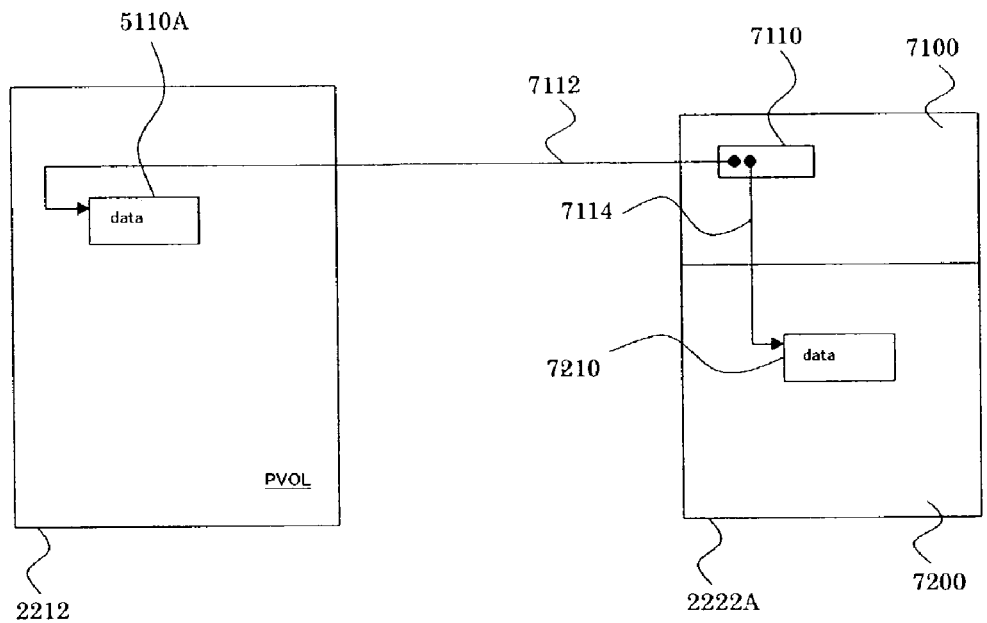
FIG. 4 shows a PVOL and a primary journal volume 2222A that are used in the embodiment of FIG. 1.

FIG. 4 shows correspondence of a PVOL 2212 and a journal volume 2222A used in this embodiment. Hereafter, the journal volume 2222A is called a primary journal volume, and the journal volume 2222B is called a secondary journal volume. Both data structures are fundamentally the same.

Generally, each of PVOL, SVOL and the journal volumes is managed in units of a predetermined logical block, e.g., 512 KB. Each of the logical blocks is given a logical block address (hereinafter, "LBA").

The primary journal volume has a metadata area 7100 and a journal data area 7200. In the journal data area 7200, the previously described journal data 7210, i.e., the copy of data 5110 stored in PVOL by the write command, is stored. In the metadata area 7100, the previously described metadata 7110, i.e., information indicating a time when each update data is stored in PVOL 2212, the storing address 7112 of the written (updated) data, address 7114 of the corresponding journal data 7210 in the journal data area 7200, and the length of the data, are stored.

Each address can be expressed with LBA and the length of data can be expressed with the number of logical blocks. Moreover, the address of data can be expressed as the difference from the base address (head LBA) of the area journal data area or metadata area), i.e., offset. Further, while the length of the metadata is fixed (e.g., 64 Byte), the length of the journal data is not fixed as it depends on the updated data by the write command in the present embodiment.

At the time of defining the journal group, each disk array device 200 performs setup of the metadata area 7100 and the journal data area 7200 for the journal volume 2222 to be set up. At this time, a head LBA and block count of each area are specified. Each host 100 executes the asynchronous copy manager 150 and issues a command (journal group composition acquisition command) that requests information on the set-up area (head LBA, block count) to the disk array device 200. This allows each host 100 to acquire information on the metadata area 7100 and the journal data area 7200 that each disk array device 200 has set.

Figure 17:
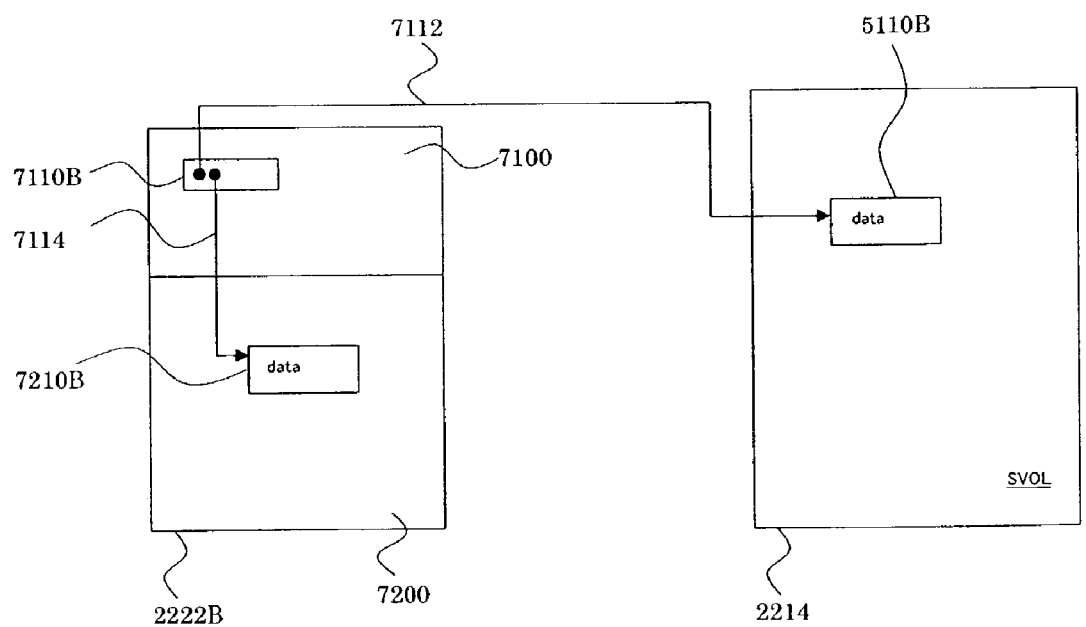
FIG. 17 shows a secondary journal volume and a SVOL that are used by the data processing system of FIG. 1.

FIG. 17 shows correspondence of a secondary journal volume 2222B and SVOL 2214 used in this embodiment. The secondary journal volume also has a metadata area 7100 and a journal data area 7200. In the metadata area 7100, the metadata 7110B, which is copied from the metadata area of the primary journal volume 2222A, is stored. In the journal data area 7200, the journal data 7210B, which corresponds to the metadata 7110B and copied from the journal data area of the primary journal volume, is stored.

While the metadata is the information about the update of PVOL 2212, its address information 7114 shows the address of the corresponding journal data 7210, which is copied to the journal data area in the secondary journal volume. Further, by copying journal data 7210 from the journal data area 7200 of the secondary journal volume 2222B to the address in SVOL 2214 corresponding to the address 7112, the update of PVOL 2212 can be reflected in SVOL 2214.

Figure 5:
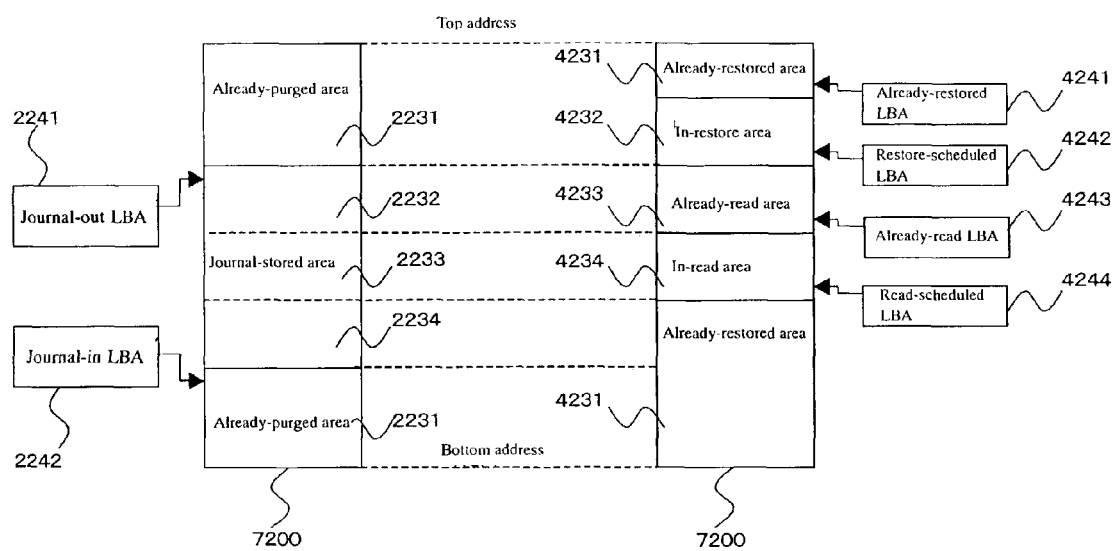
FIG. 5 shows correspondence of the journal data areas of a primary journal volume and of a secondary journal volume.

FIG. 5 shows the journal data areas of the primary journal volume and of the secondary journal volume according to the present embodiment.

The primary journal volume and the secondary journal volume are addressed with LBAs, and each LBA is brought into correspondence in a 1-to-1 manner.

The journal data area 7200 that the primary journal volume has is differentiated into a journal-stored area 2232, 2233, and 2234, in which the journal data are stored, and an already-purged area 2231 in which no journal data is stored. The already-purged area is used for storing new journal data of PVOL 2212.

The journal data area 7200 that the secondary journal volume has is differentiated into: an already-restored area 4231 in which the journal data having already been used for restore for SVOL is stored (or no journal data is stored); an in-restore area 4232 in which the journal data specified as a target of journal restore for SVOL is stored; an already-read area 4233 in which the journal data that are not being targeted for a journal restore process is stored; and an in-read area 4234 in which the journal data being transferred from the primary journal volume is stored.

The already-purged area 2231 of the primary journal volume is brought into correspondence with part of the in-restore area 4232 or the already-restored area 4231 of the secondary journal volume.

The journal-stored area of the primary journal volume is brought into correspondence with the already-read area 4233, the in-read area 4234, or part of the already-restored area 4231. Here, the journal-stored area 2232 that corresponds to the already-read area 4233 can be purged because the journal has already been transmitted to the secondary disk array device 200B. Moreover, the journal data stored in the journal-stored area 2233 that corresponds to the in-read area 4234 preferably cannot be purged because it is targeted for the data transfer. There is no necessity of purging the journal-stored area 2232 immediately after the completion of the corresponding journal copy. It is applicable that the purge is executed periodically, or even according to the indication ("journal purge command") to purge the journal-stored area 2232 issued from the primary host 100A.

Areas occupied by the journal data areas 7200 of the primary and secondary journal volumes, respectively, are identified by each host 100 by pointers indicating LBAs of the logical blocks located at boundaries of the areas. The information on a journal processing state that the primary host 100A acquires from the primary disk array device 200A includes values of these pointers.

Each host 100 acquires the values of these pointers from the disk array device 200 connected to the host 100 by issuing the journal-creation-state-acquisition command to the disk array device 200. Then, using the values of these pointers, the host 100 judges in which area of the journal volume the journal data is stored. The values of these pointers are stored in the control memory 215 in one implementation.

Hereafter, each pointer will be described. Note that, in FIG. 5, LBAs are allocated from the top to the bottom of the figure. Therefore, the number of LBA in the top of the figure is smallest. Moreover, the journal volume is used repeatedly as with a cyclic buffer. That is, if the last logical block of the journal volume was used, the head logical block is used again. In either primary or the secondary journal volume, the data are written in the sequential manner. First, the pointer of the primary journal volume will be described.

A journal-out LBA 2241 is a pointer indicating an LBA corresponding to the logical block in the head of the journal-stored area. The oldest journal data that have not been purged from the primary journal volume is stored in the logical block indicated by this pointer. The primary host 100A or the secondary host 100B decide the logical block corresponding to the LBA indicated by the journal-out LBA 2241 as the logical block in the head of the journal data that is targeted for the transfer.

A journal-in LBA 2242 is a pointer indicating an LBA corresponding to an empty logical block that adjoins the last logical block in which journal data are stored, namely a pointer indicating the LBA corresponding to the logical block in which journal data will first be stored at the next journal acquisition process. The primary host 100A or secondary host 100B decide that the logical blocks, each having an LBA equal or greater than that of the logical block corresponding to an LBA indicated by the journal-in LBA 2422, are usable for storing journal data.

Further, the primary host 100A or the secondary host 100B decide that the journal data is stored in an area from an LBA of the journal-out LBA 2241 to an LBA provided just before the journal-in LBA 2242. Therefore, if the journal-out LBA=the journal-in LBA, the primary host 100A or secondary host 100B decide that the journal data to be transferred to the secondary journal volume is not contained in the journal data area of the primary journal volume.

Next, pointers of the secondary journal volume will be described.

An already-restored LBA 4241 is a pointer indicating the logical block having the largest LBA among the logical blocks on which the restore processing has been completed. Therefore, the logical blocks having an LBA smaller than an LBA indicated by the already-restored LBA pointer will be used to store the journal data that is newly transferred from the primary journal volume. That is, in the logical blocks of the LBAs equal or less than the already-restored LBA 4241, the journal data is purged.

Purging of the secondary journal volume may be performed automatically by the storage controller 210 after the restore processing is completed. Purging the journal data can be achieved by actually overwriting meaningless data on the journal data or by moving the pointer to indicate that the area is ready to be written (overwritten). Similar to the purging of the journal-stored area 2232 in PVOL, it is not necessity to purge the secondary journal volume immediately after the completion of the corresponding restore processing.

The restore-scheduled LBA 4242 is a pointer indicating that the journal restore request command to restore SVOL 2214 using the journal data stored in an area from the logical block indicated by an LBA larger than the already-restored LBA 4241 to the logical block indicated by the restore-scheduled LBA 4242 has been issued by the secondary host 100B. Therefore, if the restore-scheduled LBA=the already-restored LBA, there is no journal data to be targeted for restoration in the secondary journal volume.

An already-read LBA 4243 is a pointer for indicating the logical block having the largest LBA among the logical blocks storing the journal data received from the primary disk array device 200A. In other words, this pointer indicates the logical block in which an end of the journal data transferred to the secondary disk array device 200B by the primary disk array device 200A.

The secondary host 100B confirms by the already-read LBA 4243 that the journal data of the primary journal volume corresponding to the journal data stored in an LBA indicated by this pointer has been stored in the secondary journal volume. The secondary host 100B that performed the confirmation notifies the primary host 100A as to information on the already-read LBA 4243. Based upon this information, the primary host 100A instructs the primary disk array device 200A to purge the journal data area up to the logical block in which the journal data corresponding to the already-read LBA 4243 is stored. This purging may also be achieved by moving the pointer of the journal-out LBA 2241.

A read-scheduled LBA 4244 is a pointer indicating LBA of an end logical block in the journal data area targeted by the newest journal copy request that the secondary host 100B issued to the secondary disk array device 200B. Therefore, if the read-scheduled LBA=the already-read LBA, there is no journal data that is targeted for journal copying. That is, no disk array device 200 is performing the journal copy process.

Further, there is the same relationship among the metadata areas of the primary and secondary journal volumes. Similar to the journal data area, pointers for the metadata area (journal-out LBA, journal-in LBA, already-restored LBA, restore-scheduled LBA, already-read LBA and read-scheduled LBA; they are different pointers to the ones of the journal data area) are used by the hosts 100 and storage controllers 210 for the purpose of managing the metadata areas.

By executing the asynchronous copy manager 150 on both sides, each host 100 may check the journal acquisition state in each disk array device 200 by acquiring a value of each pointer. For example, each host 100 calculates, for the primary and secondary journal volumes, how much or what percentage of the journal volume is being utilized based on the storage size of the journal volume determined at the time of the journal group generation and a difference of the pointers acquired from the disk array device 200.

Based upon this determination, each host 100 instructs to each disk array device 200 the following: to which point the journal stored in the primary journal volume should be purged; to which point the journal should be transferred to the secondary disk array device 200B among the journal stored in the primary journal volume; to which point the journal data should be restored in SVOL among the transferred journal data; etc.

For example, it may be prescribed that when the secondary host 100B issues the journal copy request to the secondary disk array device 200B to initiate the copy process if the host 100B determines that the journal stored in the primarily journal volume occupies at least 50 percent of its storage capacity.

The instructions that hosts 100 issue to the disk array devices 200 include a journal-creation-state-acquisition command as well as the journal processing command.

The journal-creation-state-acquisition command is issued in two cases: (1) where the primary host 100A wishes to acquire information as to how much of the journal is accumulated in the primary journal volume; (2) where the secondary host 100B wishes to acquire information as to how far the read process and the restore process of the secondary journal volume should proceed.

The journal processing command is issued in two cases: (1) where the primary host 100A wishes to purge the primary disk array device 200A of the journal; and (2) the secondary host 100B wishes to initiate the journal copy process and the journal restore process by the secondary disk array device 200B.

The LBAs of the primary journal volume and of the secondary journal volume are specified to 1:1, but the storage area of the secondary journal volume may be specified to be greater than that of the primary journal volume, which requires a method for performing proper address conversion from the primary journal volume to the secondary journal volume. Therefore, the journal copy request command and journal restore request command are kinds of the journal processing command.

Figure 6:
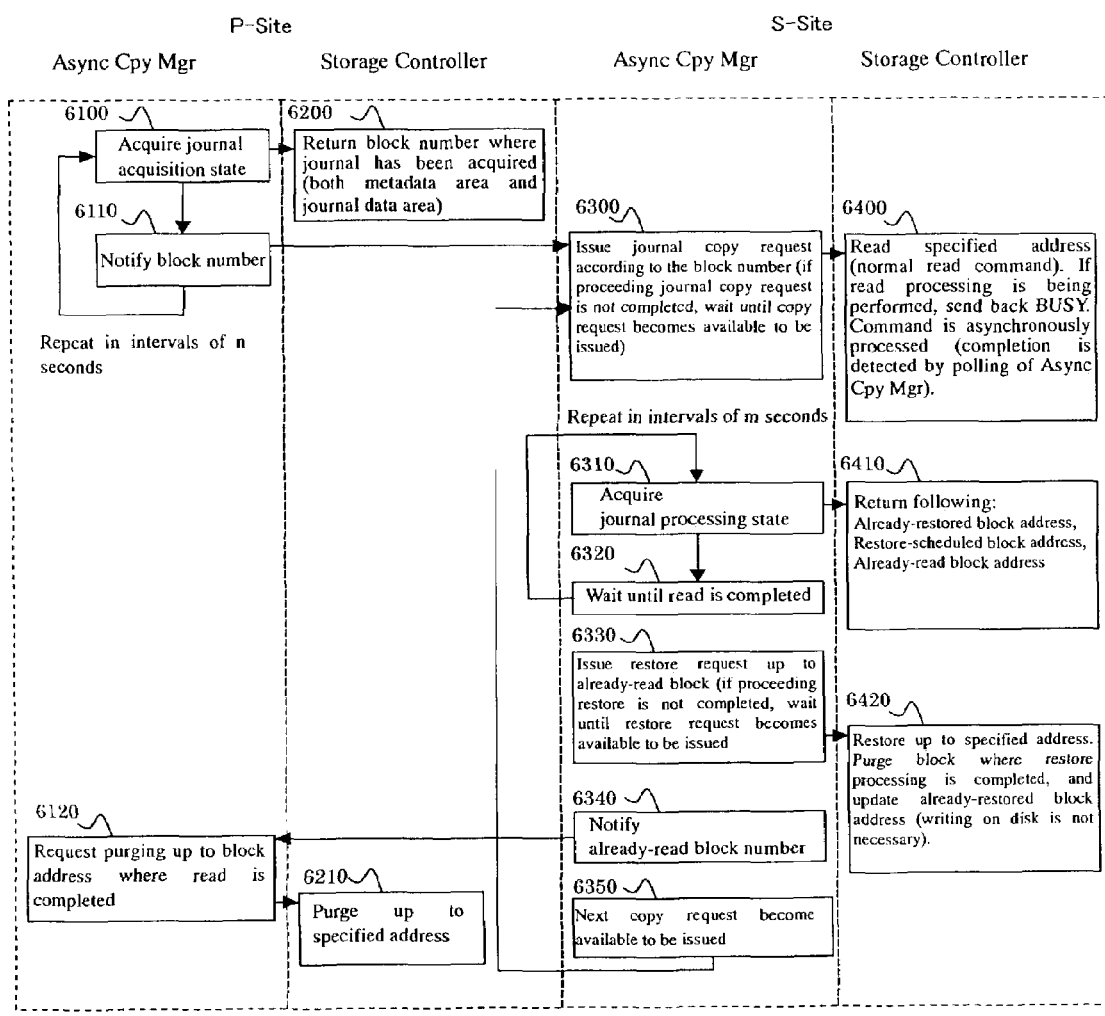
FIG. 6 is a flowchart showing the details of acquisition, copy and restore processing of the journal according to one embodiment of the present embodiment.

FIG. 6 is a flowchart showing details of the acquisition, copy, and restore processes according to present embodiment.

The primary host 100A acquires information on the journal-stored area of the primary disk array device 200A periodically (at predetermined intervals scheduled according to the user's request or at predetermined time) by using the pointers of the journal-out LBA and the journal-in LBA (Steps 6100, 6200; Step 5300 of FIG. 3) and sends the acquired information to the secondary host 100B (Step 6110).

The secondary host determines the logical block area of the primary journal volume that is targeted for the journal copy processing based on notified information indicating the journal-stored area. In addition, the primary host 100A can determine beforehand the logical block area of the primary journal volume that is targeted for the journal copying.

Subsequently the secondary host 100B issues the journal copy request command that includes information indicating the determined logical block area and information specifying the disk array device 200 that is targeted for the journal copying to the secondary disk array device 200B (Step 6300; Step 5400 of FIG. 3). The secondary disk array device 200B that received the journal copy request command issues the read command requesting the journal stored in the specified logical block area to the specified primary disk array device 200A. As shown in FIG. 4, the journal area is divided into the metadata area and the journal data area. The metadata area is specified by a journal copy request. When the secondary disk array device 200B receives a journal copy request, it issues a read command to copy from the specified logical blocks in the metadata area, determines which logical blocks in the journal data area is corresponding to the metadata according to the address in the metadata, and issues a read command to copy from the determined logical blocks (i.e. the corresponding journal data). Alternatively, the secondary disk array device may issue the read commands to copy the metadata and journal data at the same time. In such case, the address and data lengths of each read command is calculated from the pointers. For example, for the journal data, the journal data area from the read-scheduled LBA+1 to the journal-in LBA−1 of the primary journal volume is copied to the corresponding journal data area of the secondary journal volume. (Step 6400; Step 5500 of FIG. 3)

On the other hand, the secondary host 100B acquires the journal processing state of the secondary disk array device 200B periodically (Steps 6310, 6320, and 6410) by issuing the journal-creation-state-acquisition command. That is, the values of the pointers of the already-read LBA 4243 and the read-scheduled LBA 4244 are acquired from the secondary disk array device 200B. The secondary host 100B judges that journal copy process (i.e. read) has been completed if values of the already-read LBA 4243 and of the read-scheduled LBA 4244 agree with each other.

In the case where information of the read-scheduled LBA 4244 is retained in the secondary host 100B, the secondary host 100B can determine the completion of the journal copy process by obtaining the already-read LBA 4243 periodically from the secondary disk array device 200B.

If the completion of the journal copy process is confirmed, the secondary host 100B issues a journal restore request command to initiate the restoration of the data in the secondary journal volume. Alternatively, the restoration may be performed a significant time after the completion of the journal copy process if immediate restoration is not required, e.g., a case where the secondary journal volume has a large capacity (Step 6330; Step 5700 of FIG. 3.)

If the journal restore request command is received, the secondary disk array device 200B restores the journal stored in the logical block corresponding to the specified LBA (Step 6420; Step 5800 of FIG. 3).

Further, the secondary host 100B that confirmed completion of the journal copy process provides the LBA indicated by the already-read LBA 4243 to the primary host 100A (Step 6340). The secondary host 100B that detected completion of the journal copy process is ready to instruct the next journal copy request to the secondary disk array device 200B (Step 6350).

The primary host 100A that was notified of the LBA indicated by the already-read LBA 4243 instructs the primary disk array device 200A to purge the journal corresponding to the notified LBA (Step 6120). The primary disk array device 200A purges the journal volume corresponding to the instructed LBA (Step 6210).

Figure 7:
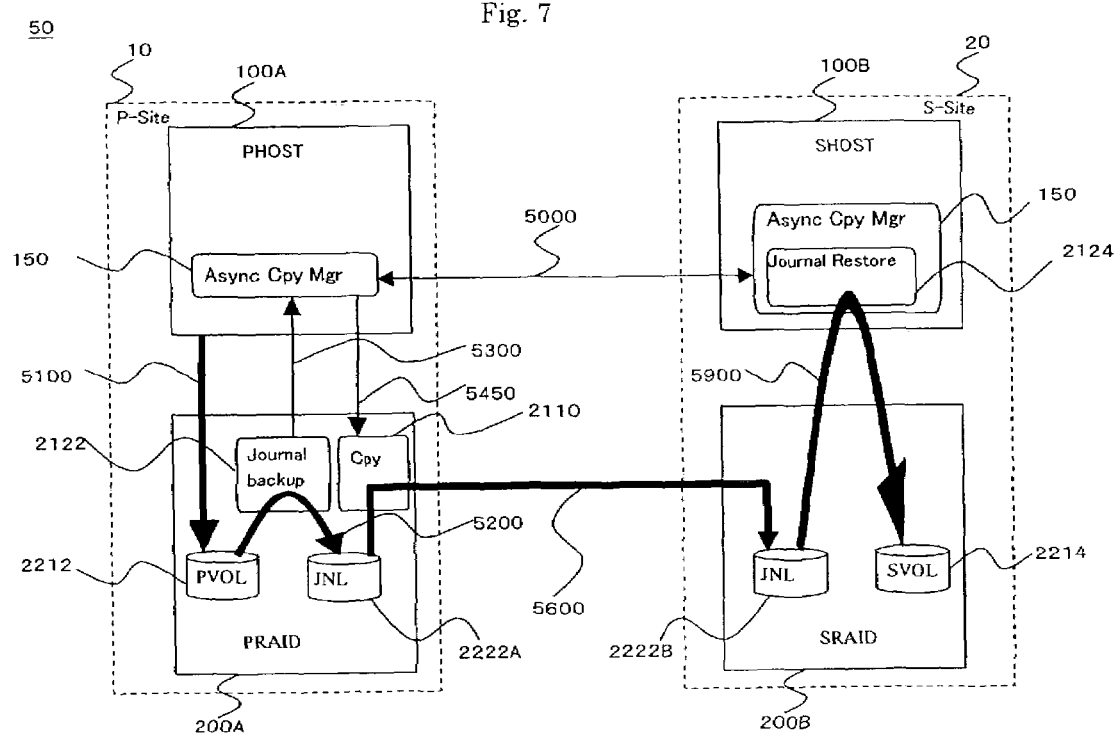
FIG. 7 shows a data processing system according to another embodiment of the present invention system.

FIG. 7 shows a second embodiment of the data processing system 50 to which this invention is applied. For illustrative convenience, the same numerals are used to refer to systems, devices, and components of this embodiment corresponding to those of the first embodiment.

Unlike the first embodiment, the data processing system 50 of FIG. 7, the primary disk array device 200A initiates the journal copy process by issuing a data write command to the secondary disk array device 200B, rather than waiting to receive a read command from the secondary disk array device 200B. In addition, the secondary host 100B performs the journal restore process (Step 5900 in FIG. 7), unlike in the first embodiment where this was performed by the secondary storage controller 210B. Accordingly, the journal restore program is provided with the secondary host.

Herein, the devices and components of the primary storage system 10 are distinguished from those of the secondary storage system 20 by being referred to primary devices or components or by being provided with the letter "A" after their numerals, or both (e.g., the primary host 100 or host 100A or primary host 100A). Likewise, the devices and components of the secondary system 20 are referred to as secondary devices or components, or by being provided with the letter "B" after their numerals, or both (e.g., the secondary host 100, the host 100B, and the secondary host 100B).

In this embodiment, since an entity of the journal copy processing is the primary disk array device 200A and an entity performing the journal restore processing is the secondary host 100B, a general storage not having a special function can be used for the secondary disk array device 200B. Moreover, the data processing system 50 may employ heterogeneous storage subsystems or disk array devices, e.g., those manufactured by different vendors or use different storage protocols or methods since the journal copy process is performed by the primary disk array device 200A and the journal restore process is performed by the secondary host 100B.

In the primary site 10, the journal acquisition process (Step 5200) relating to the updates (Step 5100) of PVOL is substantially the same as in the first embodiment. The primary host 100A acquires information on a journal creation state from the primary disk array device 200A (Step 5300).

The primary host 100A issues the journal copy request command to the primary disk array device 200A for the secondary disk array device 200B (Step 5450).

The journal copy request command includes information about the destination journal volume of the disk array device 200B to where the journal is to be transmitted, information specifying the disk array device 200B, the source journal volume of the disk array device 200A, and the like.

The primary disk array device 200A receives the journal copy request command and transmits the specified journal to the secondary disk array device 200B by issuing a write command to the secondary disk array device 200B (Step 5600). The secondary disk array device 200B stores the journal received from the first device 200A in an area of the secondary journal volume specified by the command.

Subsequently, the secondary host 100B, using an asynchronous copy manager 150, reads the journal from the secondary journal volume and restores data to SVOL 2214 (Step 5900).

The secondary host 100B performs pointer management of the secondary journal volume, and notifies information needed to make a journal copy request 5450 (for example, the already-restored LBA 4241 that is needed to calculate the address for copy) to the primary host 100A.

In this embodiment, by the instruction of the primary host 100A, the primary disk array device 200A issues the write command that requires the secondary disk array device 200B to write the initial data of PVOL 2212 into SVOL 2214 of the secondary disk array device 200B sequentially, whereby the initial copy is achieved.

After all initial data has been written in the secondary disk array device 200B from PVOL, the primary disk array device 200A executing the copy program 2110 reports completion of the initial copy to the primary host 100A. The primary host 100A receives this report. After that, SVOL 2214 restored in the secondary site 20 can be treated as a volume reflecting the contents of PVOL 2212.

Figure 8:
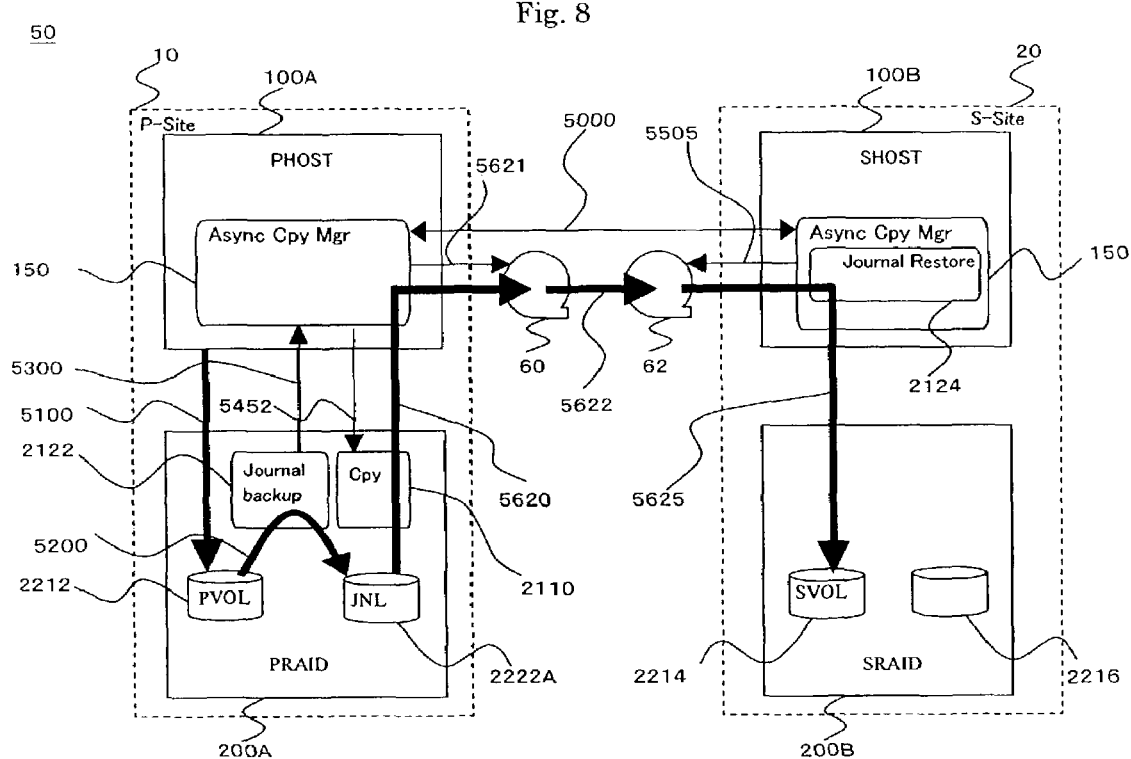
FIG. 8 shows a data processing system according to yet another embodiment of the present invention.

FIG. 8 shows a third embodiment of the data processing system 50 to which this invention is applied. The system 50 includes a first communication link 48 between the hosts but does not include a second communication link between the disk array devices 200A and 200B. The external storage devices are used in place of the second communication link in one implementation.

In this embodiment, a first external storage device 60 (e.g., a tape device) is coupled to the primary host 100A and a second external storage 62 is connected to the secondary host 100B, respectively, through the Fibre Channel. The external storages 60 and 62 may be connected with each other with the Fibre Channel etc. Alternatively, if these external storages are of removable storage media, such as a magnetic tape, they may be transferred by physically transporting the storage medium between the devices.

In this embodiment, the primary disk array device 200A performs the journal acquisition process for PVOL 2212, as in the second embodiment. The journal copy and the initial copy are performed according to the steps explained below.

(1) The primary host 100A writes data to the first external storage 60. That is, once the journal acquisition process has been started, the primary host 100A reads the journal from the primary journal volume and stores it in the external storage 60 in response to a user input or a predetermined schedule (Step 5620).

(2) The data written in the first external storage 60 is transferred to the second external storage 62. This process is achieved either by the primary host 100A or by the secondary host 100B. In one implementation, ANSI (American National Standards Institute) SCSI-3 Extended Copy command is used for these data transfer instructions.

The hosts 100A and 100B communicate address information needed for the data transfer, a report of data transfer completion, and the like via a communication link. In one implementation, the user or the administrator reports to each host 100 that the data has been transferred after physically transporting the removable recording medium from the first external storage to the second external storage (Step 5622).

(3) The data stored in the second external storage 62 is transferred to the secondary disk array device 200B in accordance with an instruction from the secondary host 100B. That is, the secondary host 100B issues read commands 5505 to the external storage 62 and reads the journal from the external storage 62. Then, the secondary host 100B restores the data of SVOL 2214, as in the second embodiment, based on the journal read from the external storage 62 (Step 5625).

By the above procedures, the data replication from PVOL to SVOL through the journal volume can be performed. The initial copy is performed in a similar way. In one implementation, the journal stored in the external storage 62 is not deleted even after the restore process, as long as there is no specific instruction. Moreover, in the external storage 62, a result of the initial copy, namely initial data, is also stored.

Furthermore, since the metadata of the journal includes a time stamp of the updating time, in the data processing system of this invention, SVOL 2214 of the secondary disk array device 200B can be restored to the contents of PVOL at an arbitrary time from the start of the journal acquisition process. That is, by restoring all pieces of the journal each having a time stamp earlier than a time specified by the secondary host 100B in SVOL in order of time, the contents of PVOL at a specified time can be restored. This is called "point in time recovery."

Further, it is also possible to perform the point in time recovery for an arbitrary volume 2216 specified by the user of the secondary disk array device 200B. That is, for this purpose, the result of the initial copy of PVOL stored in the external storage 62 is first copied to the volume 2216, and subsequently pieces of the journal each having a time stamp earlier than a point of time specified by the secondary host 100B are all restored in the volume 2216 sequentially based on the update time.

If there are a plurality of journals, for the same area, a mode in which the journal having the most recent time stamp is used to perform the restoration.

The external storages 60 and 62 may be the same or different types of storage devices. Moreover, they were described to be different devices but they can be configured to be the same device.

In the first and second embodiments, the point in time recovery involves restoring all the journals that indicate the update time (time stamp) older than the time point specified. The restorable image of PVOL, however, is limited the images after the update time indicated by the oldest journal in the secondary journal volume.

Figure 9:
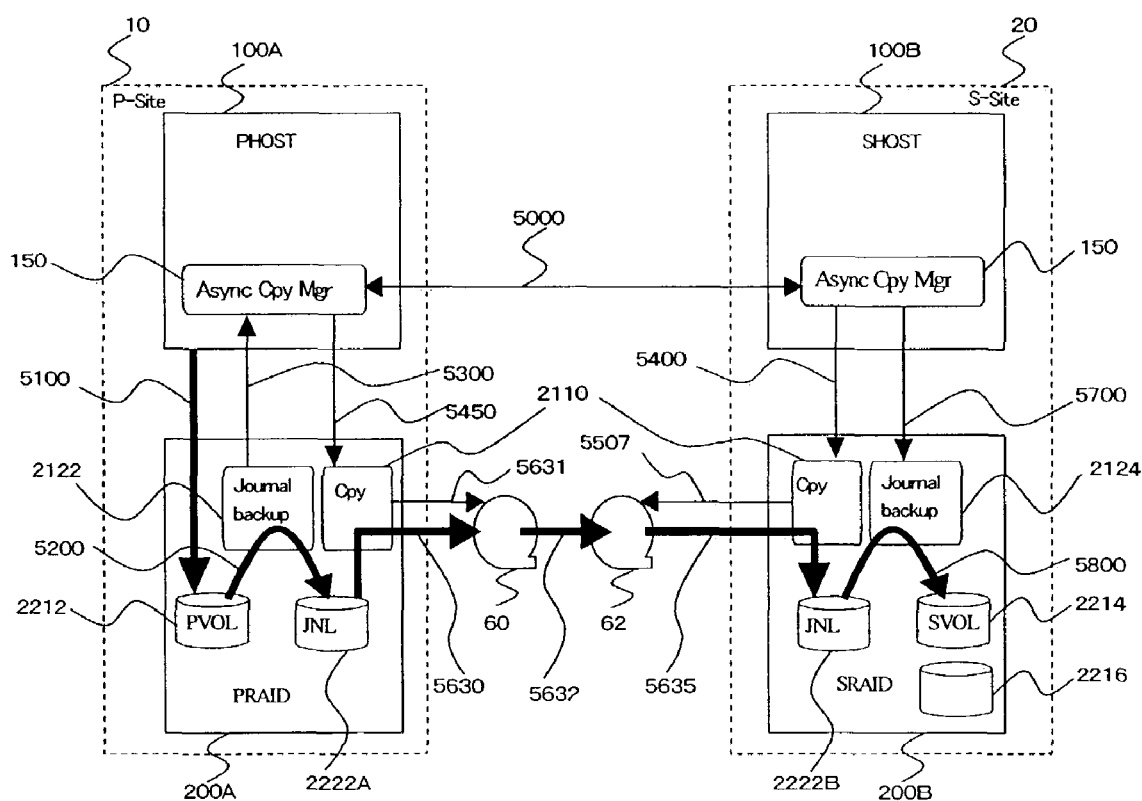
FIG. 9 shows a data processing system according to yet another embodiment of the present invention.

FIG. 9 shows a fourth embodiment of the data processing system to which this invention was applied. This embodiment is similar to the third embodiment, but differs in a respect that the external storages 60 and 62 are connected (with the Fibre Channel) to the primary disk array device 200A and the secondary disk array device 200B, respectively. Accordingly, the initial copy process and the journal copy process to the external storage device 60 is performed by the primary disk array device 200A in accordance with an instruction 5450 from the primary host 100A (Step 5630).

The data stored in the external storage 60 is moved to the external storage 62 by transferring the data over a communication link according to an instruction 5631 of the primary disk array device 200A or by physically transporting a storage medium (Step 5632).

Thereafter, the secondary disk array device 200B performs the read operation relating to the initial copy process and the journal copy from the external storage device 62 by issuing a read command 5507 based on an instruction 5400 from the secondary host 100B (Step 5635). The journal acquisition and restore processes conform to the first embodiment.

In addition, by this embodiment, the data of PVOL can be reproduced in SVOL asynchronously by transferring the journal. Unlike the third embodiment, since the disk array devices 200A and 200B transfer the data, the loads on the hosts 100A and 100B are reduced. Further, also in this embodiment, point in time recovery can be realized as in the third embodiment.

Figure 11:
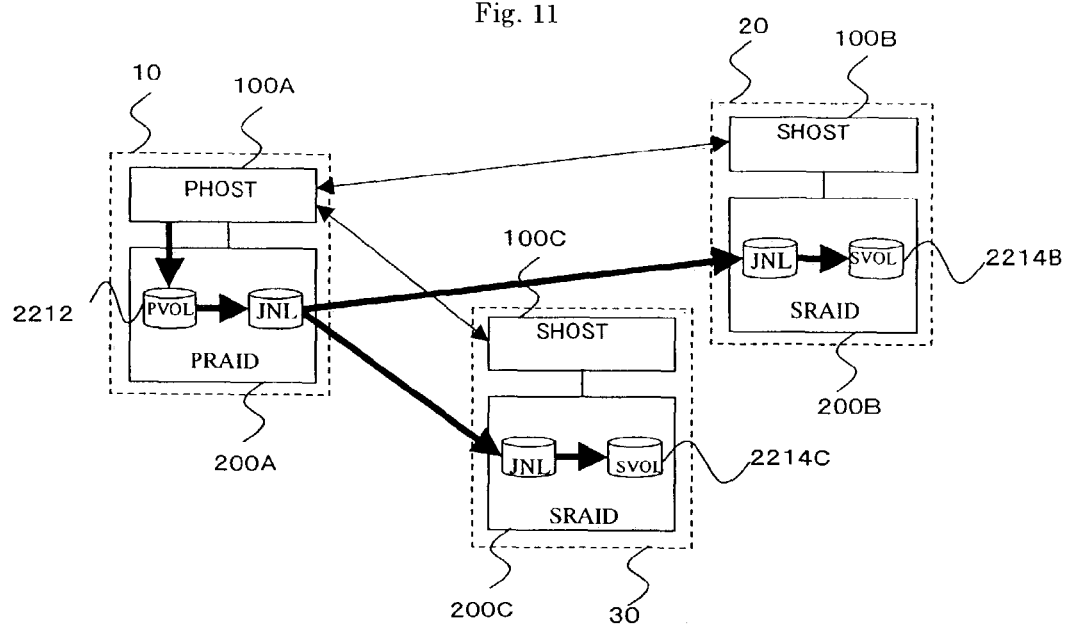
FIG. 11 shows a data processing system according to yet another embodiment of the present invention.

FIG. 11 shows a fifth embodiment of the data processing system to which this invention is applied. Unlike the foregoing embodiments described previously, the primary storage system 10 is coupled to a plurality of secondary storage systems 20 and 30 in this embodiment.

In this embodiment, the journal corresponding PVOL 2212 of the primary disk array device 200A is transferred to the secondary journal volume corresponding to SVOL 2214B of the storage system 20 and to the secondary journal volume corresponding to SVOL 2214C of the storage system 30, respectively, for the restore process. Further, initial copy is executed from PVOL 2212 to SVOL 2214B and to SVOL 2214C, respectively. Those processes are executed upon receipt of read commands from each secondary disk array device or issuance of write commands from the primary disk array device to the secondary disk array devices. Thereby, replication of the data stored in the primary site can be created in the plurality of sites.

Figure 12:
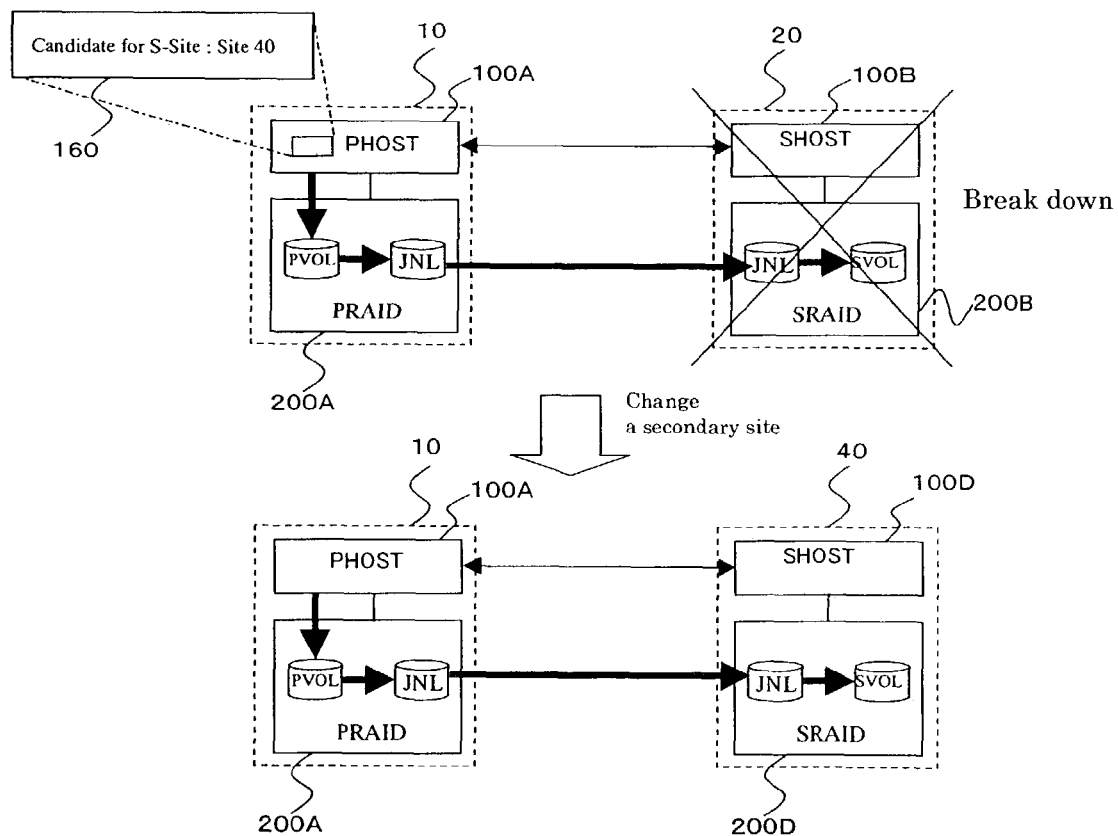
FIG. 12 shows a data processing system according to yet another embodiment of the present invention.

FIG. 12 shows a sixth embodiment of the data processing system to which this invention is applied. In this embodiment, in preparation for a case where the secondary site 20 becomes unavailable because of a failure, etc., the user or the administrator registers one or more candidates for a site usable in place of the secondary site 20 in the primary host 100A beforehand. A list or table 160 for these candidate sites is stored in the host 100A in one implementation.

If the secondary site 20 is unavailable, the primary host 100A selects a new secondary site 40 from the list 160. The primary host 100A may select an alternate secondary site according to a predetermined order of priority or the list 160 has been predefined with such a preference. The user may define this preference order or the primary host 100A may automatically define the preference using a predetermined rule, e.g., the distance between the primary site 10 and the potential secondary site, data transfer rate, etc.

After that, the primary host 100A transfers information of the device group etc. to a secondary host 100D in a newly selected secondary site 40. The new secondary host 100D that received information of the device group etc. requests setting information of the new PVOL, the journal pair and the journal copy between 100D itself and the primary host 100A to the disk array device 200D connected to the secondary host 100D. Incidentally, in most cases, since the initial copy becomes necessary, the secondary host 100D requests also the initial copy to the disk array device 200D. By these processing, in the newly selected secondary site 40, the replication of the data stored in the primary site 10 can be continued even if the secondary site 20 experiences failure before or during the remote replication procedure.

In one implementation, even if the secondary host 100B experiences failure, the secondary disk array device 200B may still be available, as a disk array device of the secondary site 40 (e.g., in a storage area network system).

Figure 13:
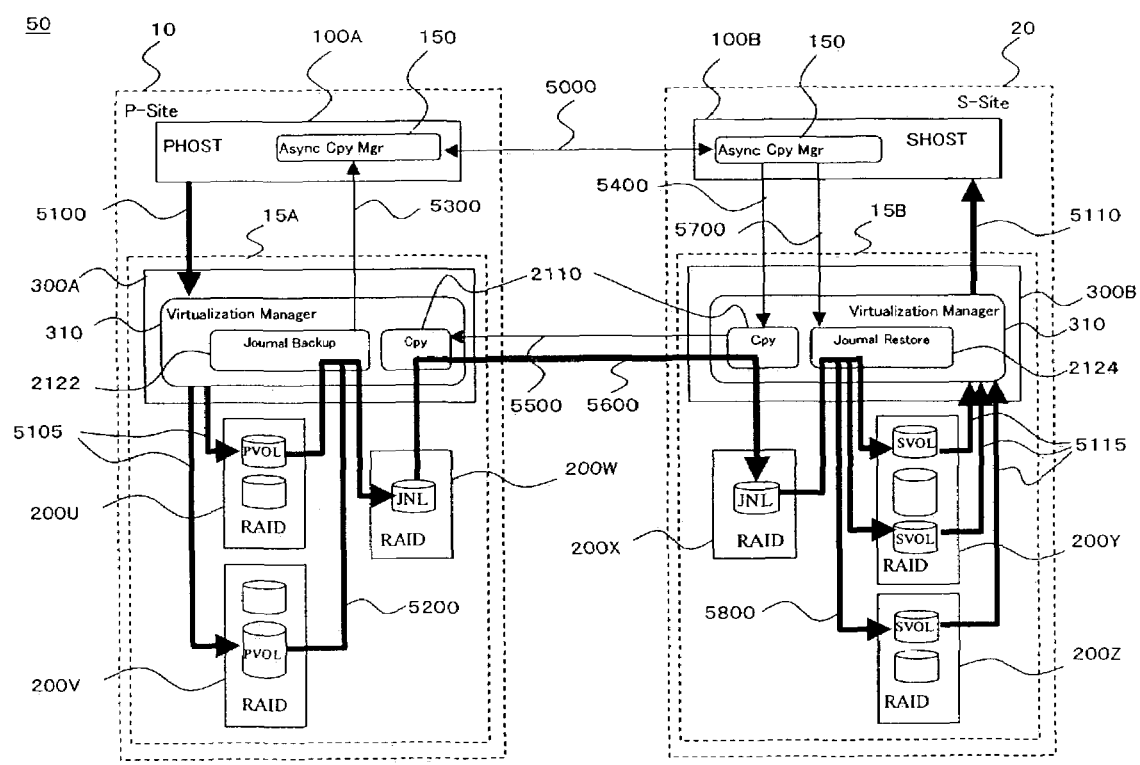
FIG. 13 shows a data processing system according to yet another embodiment of the present invention.

FIG. 13 shows a seventh embodiment of the data processing system to which this invention is applied.

Unlike the foregoing embodiments described above, this embodiment is such that the primary site 10 is composed of the primary host 100A and a virtual disk array device 15A, and the secondary site 20 is composed of the secondary host 100B and a virtual disk array device 15B. Each host 100 treats each virtual disk array device 15 as a single disk array device 200. That is, each host issues the same command as in the first embodiment to the virtual disk array device 15.

The virtual disk array device 15 is composed of the virtualization server 300 and a plurality of storage subsystems, e.g., the disk array devices 200. The virtualization server 300 is connected with the primary host 100A (the secondary host 100B), the plurality of disk array devices 200 and other virtualization server via a Fibre Channel. This Fibre Channel corresponding to the Fibre Channel 66 and 68 of the first embodiment, and is used for communication between storage controllers 210 and for the initial copy and the journal copy processes. This Fibre Channel may be through a long-distance (telecommunication) circuit, such as ATM with an intermediate of extender apparatuses in the case where the distance between the virtualization servers 300 is long, similarly with the first embodiment.

The virtualization server 300 provides a group of volumes (either a group of logical volumes or a group of physical volume) that a plurality of disk array devices 200 connected to the virtualization server 300 may use as a single (or two or more) storage subsystem to each host 100, by executing a program 310 called a virtualization manager that converts a plurality of volumes on each disk array device 200 into a single address space (hereinafter, "virtual storage image") for each connected host 100.

Here, the data transfer between the host 100 and the virtual disk array device 15 will be described briefly. The host 100A issues a write request 5100 to the virtual disk array device 15A. The write request 5100 is converted to write requests 5105 to the respective disk array devices 200 that constitute the virtual storage image corresponding to the host 100A by the virtualization server 300A. Then, the virtualization server 300A sends the converted write requests 5105 to the respective disk array devices 200. At this time, data involved in the write request 5100 is divided into several pieces of data for the respective disk array devices 200. Further, write address is converted to write addresses to the respective disk array devices 200.

The host 100B issues the data read request to the virtual disk array device 15B. The data read request is converted to read requests to the respective disk array devices 200 that constitute the virtual storage image corresponding to the host 100B by the virtualization server 300B. Then, the virtualization server 300B sends the converted read requests to the respective disk array devices 200.

Then each disk array device 200 transfers the requested data to the virtualization server 300B (Step 5115). The virtualization server 300B receives the data and integrates the received data and sends them to the host 100B (Step 5110).

Further, although not shown in FIG. 13, each virtualization server 300 is connected to a remote console through an IP network as with each host 100 and each disk array device 200. The user manages this data processing system through the remote console.

In addition, it can be considered, for example, that the following process is performed automatically by allowing the virtualization server 300 to monitor I/O processing of each disk array device 200 connected to the virtualization server 300:

(A) To alter the mapping so that the disk array device 200 in which correctable read errors (i.e. error is detected in read data but the data is correctable by the error correcting code stored with the data) come to occur frequently is replaced with another disk array device 200.

(B) To relocate data with high access frequency in a higher-speed disk array device.

In advance of these processing operations, if the technology of this invention is used, by the journal acquiring, journal copy, and journal restore process, the data on the original disk array device 200 to be replaced can be copied beforehand on the disk array device 200 that is a target device of the relocation by the control of the virtualization server. Then, if the configuration of the virtual storage image is altered, addition and deletion of the storage subsystem can be performed without discontinuing application programs.

The virtualization server 300 of the virtual disk array device 15 executes the journal-backup/restore program and the copy program.

Further, the virtual disk array device 15 has PVOL, primary and secondary journal volumes, or SVOL as was described in the foregoing embodiments. Note that PVOL, the primary and secondary journal volumes, and SVOL can be configured to exist spanning a plurality disk array devices, respectively, but these are treated as a (virtual) single volume by the host 100 or the journal-backup/restore program and the copy program that are executed on the host 100 or on the virtualization server 300 by the virtualization server 300. Therefore, the virtualization server 300 controls the same processing as the first embodiment, i.e., journal acquiring, journal copying, journal restore, and management of the journal volume, in accordance with instructions from each host 100.

Moreover, the number of the disk array device 200 to be virtualized may be increased or decreased dynamically according to a request from the user or a predetermined method. Furthermore, it is not necessary that the number of and the kind of the disk array devices 200 connected to the primary site 10 are the same as those of the secondary site 20, respectively. In this embodiment the virtualization server 300 and each host 100 were described as being different devices. However, they may be the same device; e.g., the host 100 may be provided with the virtualization manager.

Figure 14:
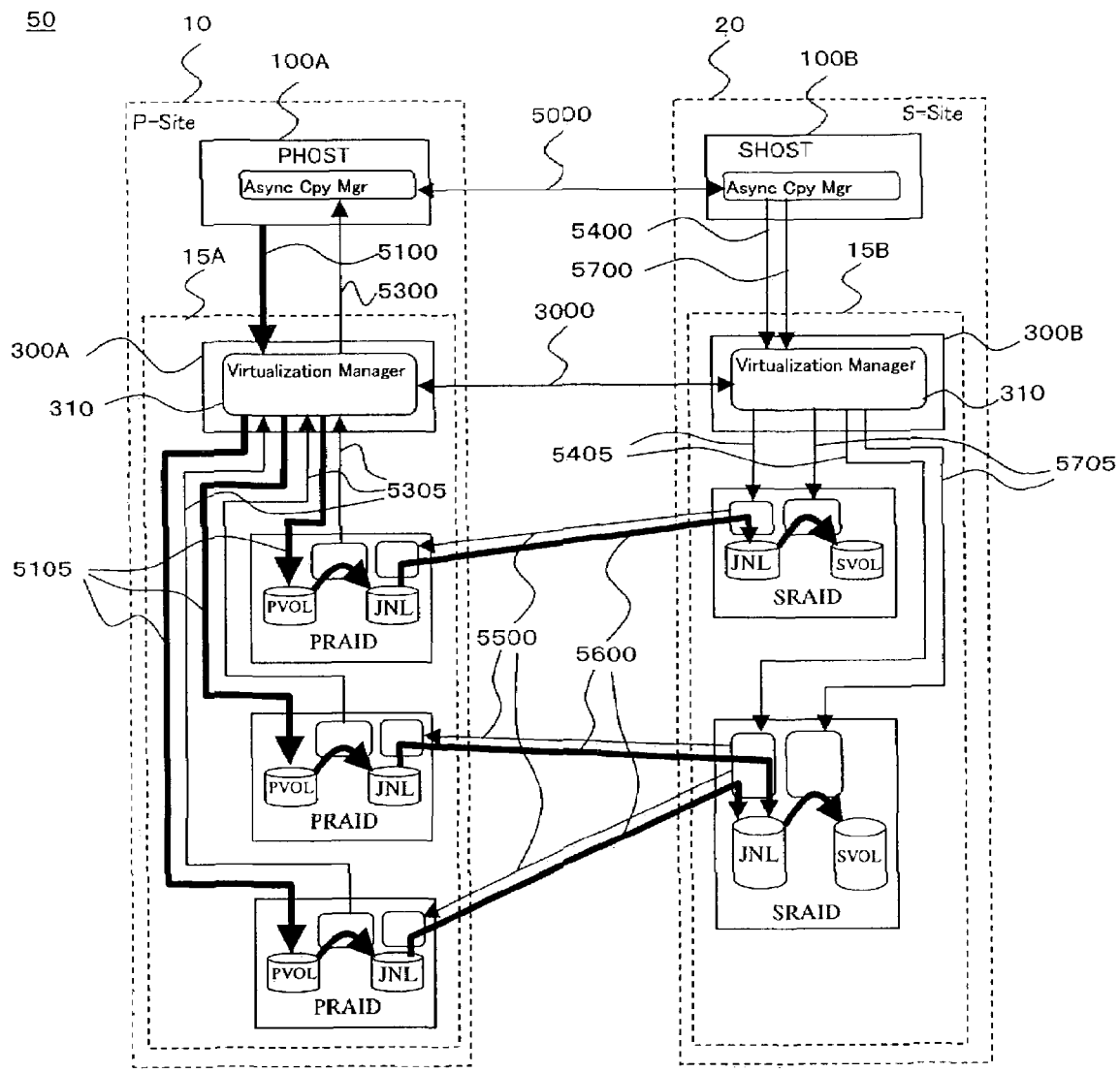
FIG. 14 shows a data processing system according to yet another embodiment of the present invention.

FIG. 14 shows an eighth embodiment of the data processing system to which this invention is applied. Although this embodiment uses the virtual disk array device 15 as in the previous embodiments, the present embodiment differs from foregoing embodiments in that the journal acquiring, journal restore and the journal copying are performed by programs on each disk array device 200 rather than by the virtualization server 300.

In addition, the disk array devices 200 of the primary site 10 and those of the secondary site 20 are connected with one another to constitute a storage area network (hereinafter, "SAN"). That is, the communication link 68 is a SAN in the present embodiment.

Further, in this embodiment, the disk array devices 200 of the primary storage system 10 must have a information about a relationship between the disk array device 200 of the secondary site 20 and the volume owned by the disk array devices 200 of the primary storage system 10, that is, which is the disk array device 200 that becomes a communication mate of the disk array devices 200 of the primary storage system 10, and vice versa. For this purpose, the virtualization servers 300 share their address mapping information each other (Step 3000), including any update to the address mapping. This mapping information, in turn, is provided to the respective disk array devices 200.

In comparison of the seventh embodiment, the virtualization servers 300 of this embodiment have reduced loads because the journal backup restore processes are performed by disk array devices 200 and transfer rates are higher since the data transfer between the primary site 10 and the secondary site 20 is performed through the SAN.

FIG. 16 shows a exemplary table 170 on address mapping between the host 100 and the disk array devices 200 used to implement the virtualized volumes provided in the seventh and eight embodiments. This table shows a case where the virtual storage images are provided two secondary hosts 100B and 100C although either FIG. 13 or FIG. 14 shows only one secondary host 100B.

The table 170 includes a column 172 relating to a target host 100 to which the virtual storage image is provided, a column 174 relating to a logical volume that the host 100 accesses (hereinafter, "host access LU"), a column 176 relating to disk array devices 200 constituting the virtual storage image, and a column 178 relating to a logical volume on each disk array device 200 (hereinafter, "storage device LU").

In another implementation, the addressing information between the host 100 and the disk array device 200 may be realized by retention of a data structure having similar information as the table 170, e.g., a list by pointers.

In above-mentioned embodiments, the initial copy process has been described as a separate process step from the journal processing. However, the initial copy may be incorporated within the journal processing by generating journals for the initial data of PVOL 2212 ("base journals") that are combined to the update journal that have been generated after the pairing (i.e. pair generation). The update journal is a journal that corresponds to an update command issued by a host after the pairing. For purposes of illustrating the embodiments of the present invention, the update journals are referred to as either "journals" or "update journals." However, the base journals are only referred to as "base journals." This terminology distinction is applied only for the Detailed Description section, not for the Claims section. Accordingly, when used in a claim, the term "journal" refers to any journal including a base journal, an update journal, or a marker journal (to be described), or a journal including any combination thereof.

In operation, the primary host 100A issues a base journal generation command to the primary disk array device 200A. Upon receiving the command, the primary disk array device 200A generates the base journals from the initial data in PVOL 2212. The initial data are data that had existed in the PVOL 2212 prior to the pairing. The base journal generation involves copying the initial data in PVOL 2212 to the journal data area of the primary journal volume as journal data of a plurality of journals and storing the corresponding metadata to the metadata area for each base journal. In the metadata of the base journal, the time information (time stamp) is the time when the base journal was generated by copying the initial data into the journal data area of the primary journal volume. Generally other metadata information for the base journal (e.g., address information and the length of the data) is same as the update journal.

After generating the base journals, the primary disk array device 200A notifies the completion of the base journal generation to the primary host 100A. In one implementation, the base journals are transferred and restored according to the methods described above in connection with the update journals.

In one embodiment, the base journals processing can be carried out in multiple stages, so that base journals are generated, transferred and restored for a portion of the initial data at a time. For example, if the storage capacity of the primary journal volume 2222A is smaller than that of PVOL 2212, only the base journals of the first half of the PVOL 2212 may be generated and stored into the primary volume at first. These base journals ("first base journals") are transferred, thereafter, to the secondary journal volume 2222B for restoration. Upon completing the transfer of the first base journals to the secondary journal volume 2222B, the base journals of the second half of the PVOL 2212 are generated and processed. When the initial copy and the journal restore is processed concurrently, it must be exclusively managed whether an area of SVOL 2214 is used for the initial copy or for the journal restore. However, if the base journals are generated and processed instead of the initial copy, such management is not needed.

In yet another embodiment, a journal includes a marker journal in addition to the base and update journal. The marker journal is a special journal used to provide control information from the primary disk array device to the secondary disk array device by the journal copy process. The marker journal is associated with a flag in its metadata for identification purposes, so that it could be easily retrieved from the journal that may include the base journal or update journal or both. A marker journal is generated by the primary disk array device under predetermined conditions (e.g., the completion or suspension of the base journal generation) and stored in the primary journal volume where the update journals are stored.

During the journal restore process, if the secondary storage subsystem determines that the restoring journal is a marker journal, the subsystem stores it in a memory and executes a predetermine process (e.g., reporting the contents of the marker journal to the secondary host 200B). In one embodiment, a storage controller reads the marker journal and stores in its memory and transmits the content of the marker journal to the host upon receiving a request from the host. Alternatively, the storage controller may initiate the transmission of the content of the marker journal to the host. The marker journal accordingly provides a convenient way to provide the secondary storage system with information about data processing events in the primary storage system, e.g., the completion of initial copy/base journal generation, the suspension or restart of initial copy/base journal generation, and the journal acquisition or other processes.

Figure 15:
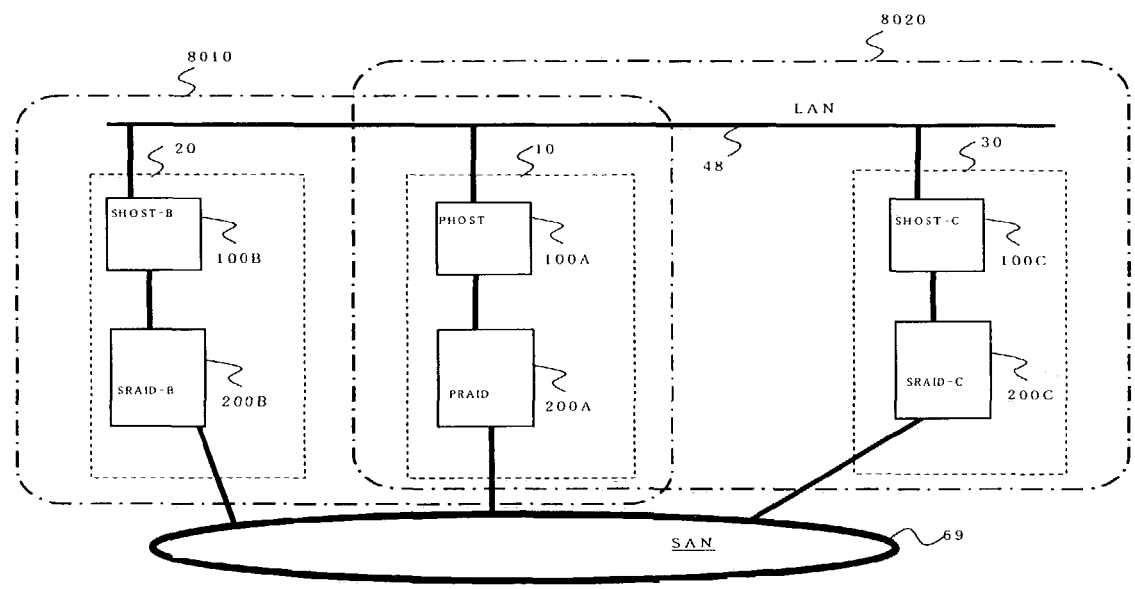
FIG. 15 shows a data processing system according to yet another embodiment of the present invention.

FIG. 15 shows a ninth embodiment of the data processing system to which this invention is applied. The data processing system 50 includes a first site 10, a second site 20, and a third site 30. The sites 10, 20, and 30 are coupled to each other by a network 69, e.g., a SAN. The system 50 defines a first site group 8010 that comprising the first site 10 and the second site 20.

Each site includes the host 100 and the asynchronous copy manager 150 that is associated with the host. The host 100A included in the first site 10 serves as the primary host 100A, and the host 100B included in the secondary site 20 serves as the secondary host 100B.

Further, the host 100 of each site performs the following processing by executing the asynchronous copy manager 150.

For example, when an abnormality occurs in its own local site (for example, a failure occurs in the disk array device 200B connected to the secondary host 100B and it becomes unavailable), this data processing system first determines whether the site where the abnormality occurred is the primary site 10 or the secondary site 20. In one implementation, each host 100 of each site monitors occurrence of abnormality in apparatuses to which the host is coupled.

If the site in which the abnormality occurred is the secondary site 20, the host 100 that detected the abnormality (e.g., the secondary host 100B) requests the host 100C of the third site 30 to form a new site group with the primary site 10, so that the remote replication may be performed despite problems experienced by the second site. If the site in which the abnormality occurred is the primary site 10, the site that detected the abnormality requests that the secondary site 20 to serve as a new primary site. The secondary site 20 that received the request then requests the third site to become a new secondary site.

If the secondary site itself has detected a failure of the primary site 10, the secondary site 20 converts itself to a new primary site.

With the use of this embodiment, it is possible, for example, to establish sites capable of supporting this invention in data centers around the world as sites for changeover at the time of a failure and lend it to customers as rental sites until the failure is restored. The customer who participates in this service can use the rental site for backup of a site owned by the customer, or to reserve a further backup site when the backup site is used. Moreover, a service provider that runs the data center can charge the customer in accordance with actual use of the rental site. The service provider may also charge the customer according to the configuration (e.g., the distance between the rental site and the backup site, the number of the backup sites, the capacity or capability of the backup site, etc.) with which the customer is provided.

The data processing systems of the above embodiments are configured make the disk array device perform the journal acquiring, journal restore and journal copying, and the host side perform the journal management and the remote copy status management. Thereby, the replication of the data between the primary site and the secondary site is performed by allowing the hosts to exchange control instructions, and actual data transfer is performed by means of the fiber cable between the disk array devices etc. This operation allows the traffic on the general line between the hosts to be reduced, and the copying can be done though higher-speed line (e.g., a private line), so that the processing performance can be improved.

Further, by using an external storage such as tape besides the private line for data movement between the primary site and the secondary site, it becomes possible to read the journal at an arbitrary point of time specified by the user from the external storage and to use that journal for journal restore process. This function enables recovery of the data at a point of time specified by the user.

Further, since the disk array device has a function of writing the journal in another disk array device by the write command, it becomes possible to realize the data transfer and the data replication by allowing the host to read that data and perform the restore, even without giving a special function to the disk array device of the secondary site.

According to the embodiments above, when the data transfer or data replication is performed among a plurality of sites, the traffic on the general line between the hosts can be suppressed and performance of the data transfer is improved. Further, recovery of data at a point of time specified by the user can be performed. Moreover, data replication among a variety of and many kinds of sites can be performed easily.

Furthermore, it is not necessary to give a special function to the disk array device of the secondary site. That is, the connection between the disk arrays that are normally not compatible to one another, for example, of different manufacturers, can be used.

In the foregoing, the invention devised by the present inventors is described concretely based on the embodiments, but it should be noted that this invention is not be limited in the embodiments and that the embodiments may be modified within a range not departing from the spirit of the invention.

What is claimed is:

1. A data processing system, comprising:
   a first storage system including a first host and a first storage subsystem, wherein the first host has a first copy manager, the first copy manager being operable to manage a data replication operation, and the first storage subsystem is a disk array device including a first storage controller and first disk devices;
   a second storage system including a second host and a second storage subsystem, wherein the second host has a second copy manager, the second copy manager being operable to manage a data replication operation, and the second storage subsystem is a disk array device including a second storage controller and second disk devices;
   a first communication link coupling the first host and the second host to exchange management information between the first host and the second host to manage the data replication operation, the management information including first control information transmitted from the first host to the second host; and
   a data transfer path coupling the first storage subsystem and the second storage subsystem, which is configured to transfer data stored in the first storage subsystem to the second storage subsystem to replicate the data of the first storage subsystem in the second storage subsystem, the data transfer path being different from the first communication link,
   wherein the second host is configured to cause execution of the second copy manager to transfer the data from the first storage subsystem to the second storage subsystem and transfer a copy request by using the first control information received from the first host through the first communication link,
   wherein the second storage subsystem is configured to receive the copy request from the second host, and transmit a data transfer request to the first storage subsystem, and
   wherein the first storage subsystem is configured to transmit data stored in the first storage subsystem to the second storage subsystem via the data transfer path upon receiving the data transfer request from the second storage subsystem.

2. The data processing system of claim 1, wherein the first storage subsystem includes a first storage area in the first disk devices for storing data, and a second storage area in the first disk devices for storing a journal, the first storage controller being configured to write data to the first storage area according to requests from the first host and update any data image change in the first storage area to the second storage area, wherein the first storage controller is further configured to receive the data transfer request from the second storage subsystem and transfer the journal from the second storage area to the second storage subsystem via the data transfer path upon receiving the data transfer request from the second storage subsystem, the journal including journal data and metadata.

3. The data processing system of claim 2, wherein the second storage subsystem includes a third storage area in the second disk devices for storing the journal received from the first storage subsystem, and a fourth storage area in the second disk devices for storing data that have been restored using the journal received from the first storage subsystem, the restored data corresponding to the data stored in the first storage area, the journal including an update journal.

4. The data processing system of claim 3, wherein the data transfer path includes a storage area network, the first storage area being a logical volume associated with one or more first disk devices and the second storage area being a logical volume associated with one or more second disk drive devices, wherein the journal includes a base journal or a marker journal, or both.

5. The data processing system of claim 3, further comprising:
   a third storage system including a third host and a third storage subsystem, the third host having a third copy manager, the third host being coupled to the first host via a communication link, the third storage subsystem being a disk array system including a third storage controller and third disks, and the third storage subsystem being coupled to the first storage subsystem via a data transfer path,
   wherein the third storage subsystem is configured to receive the journal from the first storage subsystem and obtain the restored data from the journal if the second storage subsystem is unable to receive the journal or obtain the restored data.

6. The data processing system of claim 5, wherein the first host has an access to a candidate list including one or more potential storage systems that can receive the journal and obtain the restored data in place of the second storage system if the second storage system experiences a failure.

7. The data processing system of claim 1, wherein the first copy manager and the second copy managers are asynchronous copy managers, and the first storage subsystem and the second storage subsystems are provided in remote locations from each other.

8. A data processing system, comprising:
   a first storage system including a first host and a first storage subsystem, the first host having access to a first copy manager, the first copy manager being operable to manage a data replication operation;
   a second storage system including a second host and a second storage subsystem, the second host having access to a second copy manager, the second copy manager being operable to manage a data replication operation;
   a first communication link coupling the first host and the second host to exchange management information between the first and second hosts to manage the data replication operation, the management information including first control information transmitted from the first host to the second host; and
   a data transfer path configured to transfer data stored in the first storage subsystem to the second storage subsystem and replicate the data of the first storage subsystem in the second storage subsystem, the data transfer path being different from the first communication link, wherein the second host is configured to cause execution of the second copy manager using the first control information to initiate transfer of the data from the first storage subsystem to the second storage subsystem, wherein the data transfer path includes a first data link coupling the first storage system to a first external storage device for transferring the data from the first storage system to the first external storage device, wherein the data transfer path further includes a second data link coupling the second storage system to a second external storage device, the second external storage device configured to receive the data from the first storage system stored in the first external storage device, so that the data from the first storage system can be transferred to the second storage system.

9. A method for performing a remote replication in a data processing system including a first storage system including a first host and a first storage subsystem and a second storage system including a second host and a second storage subsystem, the method comprising:

transmitting a completion notification from the second storage subsystem to the second host to inform the second host that the second storage subsystem has finished receiving first information from the first storage subsystem via a data transfer link coupling the first and second storage subsystems;

receiving at the second storage subsystem a restore command from the second host to obtain second information using the first information, the second information being associated with the first information; and performing a restoration process to obtain the second information at the second storage subsystem upon receiving the restore command, the second information being a copy of data stored in the first storage subsystem, wherein the first and second hosts are coupled to each other via a communication link to transmit or receive management information relating to the remote replication method.

10. The method of claim 9, further comprising:

storing the second information in a first storage area of the first storage subsystem according to an instruction of the first host;

thereafter, storing the first information that is associated with the second information in a second storage area of the first storage subsystem; and informing the first host that the first storage subsystem is ready to transfer the first information to the second storage subsystem once a given amount of the first information is stored in the second storage area, wherein a data transfer notification is sent from the first host to the second host informing the second host that the first storage subsystem is ready to transfer the first information to the second storage subsystem, wherein the first information is a journal, the journal including journal data and metadata, the journal data corresponding to the second information.

11. A method for storing data in a storage system, the method comprising:

storing data in a first storage area in a first storage subsystem of a first storage system according to an instruction of a first host associated with the first storage subsystem, the first storage system including the first host and the first subsystem;

storing an update journal in a second storage area in the first storage subsystem, the update journal corresponding to the data stored in the first storage area, the update journal including journal data and metadata;

notifying the first host that the first storage subsystem is ready to transfer the update journal to a second storage system, so that the first host can inform the second storage system via a first communication link that the first storage subsystem is ready to transfer the update journal to the second storage system, the first communication link being configured to exchange management information between the first host and the second storage system; and transferring a journal including the update journal to the second storage system via a data transfer path that is different from the first communication link.

12. The method of claim 11, wherein the second storage system including a second host and a second storage subsystem, the first communication link being an IP network, the data path being a Fibre Channel, the first and second storage subsystems being disk array devices, the method further comprising:

storing a base journal in the second storage area that is derived from at least a portion of initial data that had been stored in the first storage area prior to the storing-data-in-a-first-storage-area step, the journal transferred to the second storage system further including the base journal;

receiving a notification at the first host from the second host via the first communication link coupling the first and second hosts, the notification informing the first host that the journal has been received by the second storage subsystem;

transmitting an instruction to the first storage subsystem from the first host to prepare the second storage area for storing new information therein.

13. A computer readable medium for managing a data processing system, the medium comprising:

code for storing data in a first storage area in a first storage subsystem of a first storage system according to an instruction of the a first host that is associated with the first storage subsystem, the first storage system including the first host and the first subsystem;

code for storing a journal in a second storage area in the first storage subsystem, the journal corresponding to the data stored in the first storage area, the journal including journal data and metadata;

code for notifying the first host that the first storage subsystem is ready to transfer the journal to a second storage system, so that the first host, in turn, can notify the second storage system via a first communication link that the first storage subsystem is ready to transfer the journal to the second storage system, the first communication link being configured to exchange management information between the first host and the second storage system; and code for transferring the journal information to the second storage system via a data transfer path that is different from the first communication link.

14. A storage subsystem provided in a data processing system, the data processing system including a first storage system and a second storage system, the first storage system including a host and the storage subsystem, wherein the storage system comprising:

a storage controller to communicate with the host that is coupled to a remote host of a remote storage system via a first communication link, the first communication link being configured to exchange management information between the host of the storage subsystem and the remote host of the remote storage system;

a first storage area to store data according to an instruction of the host of the storage subsystem;

a second storage area to store a journal corresponding to the data stored in the first storage area, the journal including journal data and metadata; and a communication interface coupled to a second communication link, the second communication link coupling the storage subsystem and a remote storage unit of the remote storage system, the second communication link being configured to transfer the journal to the remote storage unit and being different than the first communication link, wherein the storage subsystem is configured to notify the host when the storage subsystem is ready to transfer the journal stored in the second storage area to the remote storage unit.

15. A data processing system, comprising:

a primary storage system including a primary host and a primary storage subsystem, the primary storage subsystem being configured to perform an asynchronous remote replication procedure, the primary storage subsystem including a first storage area for storing data and a second storage area for storing a journal corresponding to the data;

a secondary storage system including a secondary host and a secondary storage subsystem, the secondary subsystem being configured to perform an asynchronous remote replication procedure, the secondary storage subsystem including a third storage for receiving and storing the journal from the primary storage subsystem and a fourth storage for storing data that has been restored using the journal received from the primary storage subsystem, the restored data being a copy of the data stored in the first storage area;

a first communication link coupling the primary host and the secondary host to exchange management information; and a second communication link coupling the primary storage subsystem and the secondary storage subsystem to exchange data between the primary and secondary storage subsystems, wherein the primary host is configured to provide management information about the journal stored in the second storage area to the secondary host via the first communication link;

wherein the secondary host is configured to instruct the secondary storage subsystem to obtain the restored data from the journal received from the primary storage subsystem upon receiving a notification that a receipt of the journal has been completed from secondary storage subsystem, wherein the primary storage subsystem is configured to retrieve the journal from the second storage area and transfer the journal to the secondary storage system via the second communication link upon receiving a data transfer request or determining a predetermined condition has been satisfied.

16. The data processing system of claim 15, wherein the primary storage subsystem is manufactured by a first vendor and the secondary subsystem is manufactured by a second vendor different from the first vendor, the first and second communication links being the same communication network.

* * * * *